US012673697B2

(12) United States Patent
Bhanushali

(10) Patent No.: US 12,673,697 B2
(45) Date of Patent: Jul. 7, 2026

(54) METHOD FOR IMPROVING SAFETY OF AUTONOMOUS DRIVING BY RECOGNIZING DAMAGED MOTOR VEHICLES AND RISKY DRIVERS

(71) Applicant: VALEO SCHALTER UND SENSOREN GMBH, Bietigheim-Bissingen (DE)

(72) Inventor: Jagdish Bhanushali, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 118 days.

(21) Appl. No.: 18/442,650

(22) Filed: Feb. 15, 2024

(65) Prior Publication Data

US 2025/0263093 A1      Aug. 21, 2025

(51) Int. Cl.
| | |
|---|---|
| *B60W 50/14* | (2020.01) |
| *B60W 60/00* | (2020.01) |
| *G07C 5/02* | (2006.01) |

(52) U.S. Cl.
CPC ........ *B60W 60/0015* (2020.02); *B60W 50/14* (2013.01); *G07C 5/02* (2013.01);
(Continued)

(58) Field of Classification Search
CPC ............. B60W 60/0015; B60W 50/14; B60W 2420/403; B60W 2420/54;
(Continued)

(56) References Cited

U.S. PATENT DOCUMENTS

| | | | |
|---|---|---|---|
| 10,229,462 B2 * | 3/2019 | Bogovich | H04W 4/029 |
| 11,977,385 B2 * | 5/2024 | Govardhanam | G05D 1/0231 |

(Continued)

FOREIGN PATENT DOCUMENTS

| | | |
|---|---|---|
| CN | 105488789 A | 4/2016 |
| CN | 112907576 A | 6/2021 |
| DE | 10116277 A1 | 10/2002 |

OTHER PUBLICATIONS

Varad Mohan "Car Damage Detection using AI: Methodology and Approach for High Accuracy" Inspektlabs, Aug. 25, 2022, Inspektlabs website, Retreived Feb. 14, 2024, URL: https://inspektlabs.com/blog/car-damage-detection-using-ai-methodology-and-approach-for-high-accuracy/ (15 pages).

*Primary Examiner* — Ashley L Redhead, Jr.
(74) *Attorney, Agent, or Firm* — Osha Bergman Watanabe & Burton LLP

(57)          ABSTRACT

A method for operating a driver assistance system of a vehicle includes initiating an autonomous or semi-autonomous driving process of the vehicle, collecting data associated with surrounding vehicles within an external environment of the vehicle, and transmitting the data associated with the surrounding vehicles to a Central Processing Unit (CPU) comprising one or more processors. The method further includes determining, with one or more machine learned models, safety concerns of the surrounding vehicles based on the data associated with the surrounding vehicles, determining, with the one or more machine learned models, a safety score of each surrounding vehicle of the surrounding vehicles located within a predetermined distance from the vehicle based on the respective safety concerns of each surrounding vehicle, and updating, with the one or more machine learned models, a driving trajectory of the autonomous or semi-autonomous driving process of the vehicle based on the safety scores of the surrounding vehicles.

18 Claims, 8 Drawing Sheets

(52) U.S. Cl.
CPC ... *B60W 2420/403* (2013.01); *B60W 2420/54* (2013.01); *B60W 2554/4041* (2020.02); *B60W 2554/4042* (2020.02); *B60W 2554/4046* (2020.02)

(58) Field of Classification Search
CPC . B60W 2554/4041; B60W 2554/4042; B60W 2554/4046; G07C 5/02
See application file for complete search history.

(56) References Cited

U.S. PATENT DOCUMENTS

| | | | | |
|---|---|---|---|---|
| 12,026,729 B1 * | 7/2024 | Sanchez | ................. | G06N 3/045 |
| 12,084,050 B1 * | 9/2024 | Bourget | .......... | B60W 60/00276 |
| 12,381,950 B2 * | 8/2025 | Tran | ........................ | H04L 67/12 |
| 2020/0164895 A1 * | 5/2020 | Boss | ................. | B60W 60/0053 |
| 2020/0310413 A1 * | 10/2020 | Zhao | ........................ | H04L 67/12 |
| 2020/0339196 A1 * | 10/2020 | Jang | ........................ | B60W 40/06 |
| 2021/0116916 A1 * | 4/2021 | He | ....................... | B60W 60/0011 |
| 2021/0156708 A1 * | 5/2021 | Wojcik | ............... | G01C 21/3697 |
| 2021/0179121 A1 * | 6/2021 | Lopez | ................. | B60W 50/038 |
| 2021/0295705 A1 * | 9/2021 | Yang | ................... | G01C 21/3407 |
| 2022/0055620 A1 * | 2/2022 | Gassmann | ............. | G06V 20/59 |
| 2022/0126864 A1 * | 4/2022 | Moustafa | .............. | B60W 40/09 |
| 2022/0135075 A1 * | 5/2022 | Ng | .......................... | G06V 20/56 |
| | | | | 701/301 |
| 2024/0101128 A1 * | 3/2024 | Bradley | ............ | B60W 50/0097 |
| 2024/0157935 A1 * | 5/2024 | Esna Ashari Esfahani | ................. | |
| | | | | G06V 20/582 |
| 2024/0185717 A1 * | 6/2024 | Wendt | ....................... | B62J 11/04 |
| 2024/0351615 A1 * | 10/2024 | Song | ............... | B60W 30/18163 |
| 2024/0391482 A1 * | 11/2024 | Fox | ................. | B60W 30/0953 |
| 2025/0106399 A1 * | 3/2025 | Zhou | .................... | H04N 19/132 |

* cited by examiner

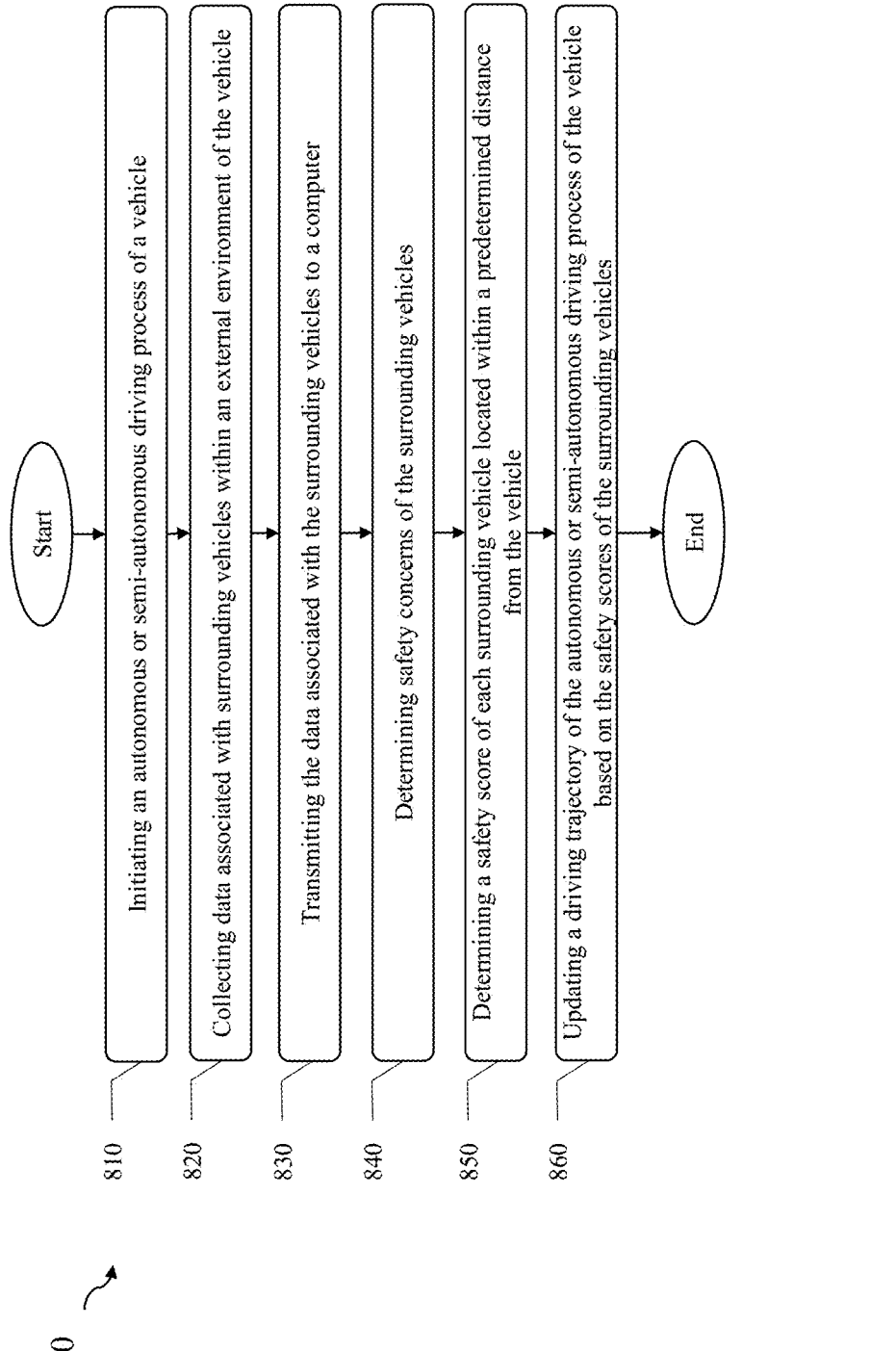

800

810 Initiating an autonomous or semi-autonomous driving process of a vehicle

820 Collecting data associated with surrounding vehicles within an external environment of the vehicle 830 Transmitting the data associated with the surrounding vehicles to a computer 840 Determining safety concerns of the surrounding vehicles 850 Determining a safety score of each surrounding vehicle located within a predetermined distance from the vehicle 860 Updating a driving trajectory of the autonomous or semi-autonomous driving process of the vehicle based on the safety scores of the surrounding vehicles

Figure 8

METHOD FOR IMPROVING SAFETY OF AUTONOMOUS DRIVING BY RECOGNIZING DAMAGED MOTOR VEHICLES AND RISKY DRIVERS

BACKGROUND

Recent advances in the field of driver assistance systems enable vehicles to detect and classify moving and stationary objects while driving, through the use of an object detection system. As such, vehicles are increasingly equipped with numerous sensors. Such sensors include, for example, cameras, LiDAR sensors, ultrasonic sensors, etc.

Driver assistance systems may signal to a driver or control the functions of a vehicle in order to facilitate the direction and speed of the vehicle, the reduction of fuel consumption, and collision prevention based on data collected by the object detection system. In addition to features of the roadway, such as traffic signs, lanes of the roadway, crosswalks, etc., these aforementioned functions of the driver assistance system may be heavily influenced by the actions of surrounding vehicles within the external environment of said vehicle. As such, in order to optimize the functions performed by a driver assistance system and to reduce the risk of accidents, it may be beneficial to determine various characteristics of the surrounding vehicles. For example, it may be beneficial for the driver assistance system to classify the surrounding vehicles according to vehicle type or to determine various characteristics of the surrounding vehicles as these features may lead to driver assistance system to perform different actions.

SUMMARY

One or more embodiments of the present invention relate to a method for operating a driver assistance system of a vehicle that includes initiating an autonomous or semi-autonomous driving process of the vehicle, collecting data associated with surrounding vehicles within an external environment of the vehicle, and transmitting the data associated with the surrounding vehicles to a Central Processing Unit (CPU) comprising one or more processors. The method further includes determining, with one or more machine learned models, safety concerns of the surrounding vehicles based on the data associated with the surrounding vehicles, determining, with the one or more machine learned models, a safety score of each surrounding vehicle of the surrounding vehicles located within a predetermined distance from the vehicle based on the respective safety concerns of each surrounding vehicle, and updating, with the one or more machine learned models, a driving trajectory of the autonomous or semi-autonomous driving process of the vehicle based on the safety scores of the surrounding vehicles.

One or more embodiments of the present invention relate to a non-transitory computer readable medium storing instructions executable by one or more processors of a CPU, the instructions include functionality for initiating an autonomous or semi-autonomous driving process of a vehicle and receiving data associated with surrounding vehicles within an external environment of the vehicle from a plurality of detection sensors of the vehicle. The instructions further include functionality for determining, with one or more machine learned models, safety concerns of the surrounding vehicles based on the data associated with the surrounding vehicles, determining, with the one or more machine learned models, a safety score of each surrounding vehicle of the surrounding vehicles located within a predetermined distance from the vehicle based on the respective safety concerns of each surrounding vehicle, and updating, with the one or more machine learned models, a driving trajectory of the autonomous or semi-autonomous driving process of the vehicle based on the safety scores of the surrounding vehicles.

One or more embodiments of the present invention relate to a driver assistance system of a vehicle that includes a plurality of detection sensors configured to collect data associated with surrounding vehicles within an external environment of the vehicle, one or more machine learned models, and a CPU. The CPU includes one or more processors and a non-transitory computer readable medium storing instructions executable by the one or more processors. The instructions include functionality for initiating an autonomous or semi-autonomous driving process of the vehicle and receiving the data associated with the surrounding vehicles from the plurality of detection sensors. In addition, the instructions include functionality for determining, with the one or more machine learned models, safety concerns of the surrounding vehicles based on the data associated with the surrounding vehicles, determining, with the one or more machine learned models, a safety score of each surrounding vehicle of the surrounding vehicles located within a predetermined distance from the vehicle based on the respective safety concerns of each surrounding vehicle, and updating, with the one or more machine learned models, a driving trajectory of the autonomous or semi-autonomous driving process of the vehicle based on the safety scores of the surrounding vehicles.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIG. 8 shows a flowchart of a method in accordance with one or more embodiments disclosed herein.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards systems and methods useful for increasing the safety of a vehicle by updating a driving trajectory or parking trajectory of an autonomous or semi-autonomous driving process of the vehicle based on collected data associated with surrounding vehicles within the external environment of the vehicle. The techniques discussed in this disclosure may advantageously employ one or more machine learned models to detect safety concerns of surrounding vehicles, assign safety scores to the surrounding vehicles, and update a driving trajectory or a parking trajectory of the vehicle based on the safety scores of the surrounding vehicles. Advantageously, the techniques discussed in this disclosure recognize surrounding vehicles that include characteristics that are deemed unsafe. Additionally, the techniques discussed in this disclosure advantageously update a driving trajectory or parking trajectory of an autonomous or semi-autonomous driving process of the vehicle in order to position the vehicle in a safe location along the roadway.

Figure 1:
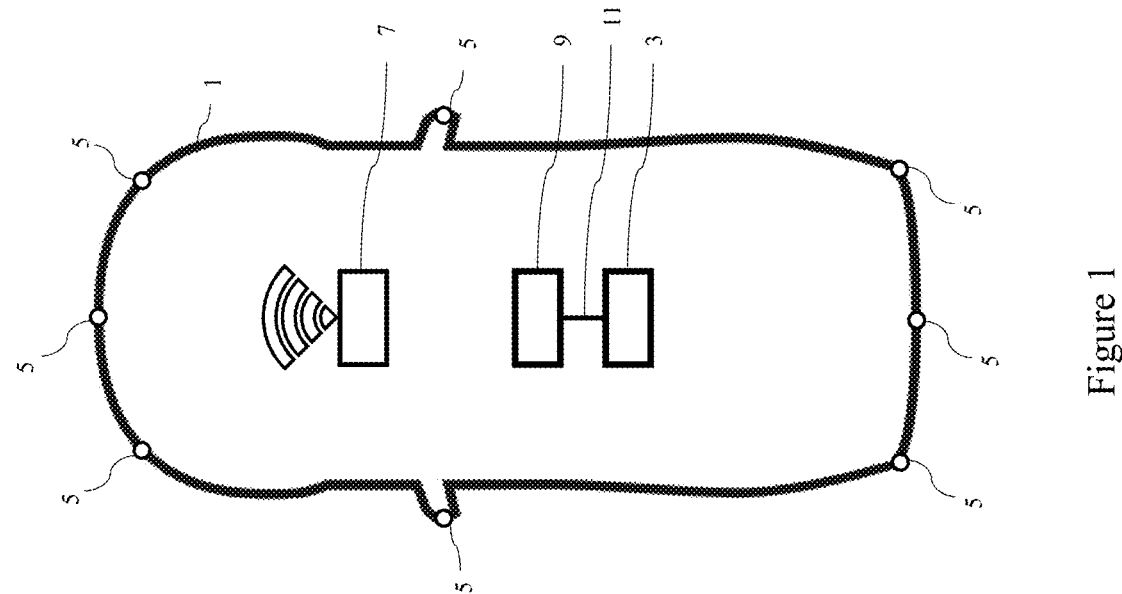
FIG. 1 shows a system in accordance with one or more embodiments disclosed herein.

FIG. 1 depicts an example of a vehicle 1 in accordance with one or more embodiments disclosed herein. As shown in FIG. 1, a vehicle 1 includes a Central Processing Unit (CPU) 3 and a plurality of detection sensors 5. In addition, the vehicle 1 may further include a navigational sensor 7 and a dashboard 9. Components of the vehicle 1 may be interconnected through the use of a bus 11, which is at least one wire, wiring harness, and/or connector that serve to transmit data throughout the vehicle 1. Collectively, the CPU 3, the plurality of detection sensors 5, the navigational sensor 7, and the bus 11 are part of an Advanced Driver Assistance System (ADAS), which is further discussed in relation to FIG. 7.

The plurality of detection sensors 5 collect quantitative data associated with the external environment of the vehicle 1. In particular, the plurality of detection sensors 5 collect data associated with surrounding vehicles (e.g., FIGS. 5A and 5B) within the external environment of the vehicle 1. At least one detection sensor 5 of the plurality of detection sensors 5 may be a visual sensor. Examples of a visual sensor 5 include a two dimensional camera, a three dimensional or stereoscopic camera, a radar unit, a LiDAR unit, an ultrasonic sensor, or an equivalent sensor or component that visually perceives the environment of the vehicle 1. In one or more embodiments, at least one detection sensor 5 of the plurality of detection sensors 5 may be an audio sensor. Examples of an audio sensor include a microphone or an equivalent sensor or component that audibly perceives the environment of the vehicle 1. Furthermore, the plurality of detection sensors 5 may include a plurality of visual sensors and a plurality of audio sensors that include all the same type of visual sensors and audio sensors, respectively, or the plurality of visual sensors and the plurality of audio sensors may include a combination of visual sensors and audio sensors, respectively, that vary in type.

In addition to the plurality of detection sensors 5, the vehicle 1 includes a navigational sensor 7 that receives a signal that includes global coordinates of the vehicle 1. The navigational sensor 7 may be a Global Positioning System (GPS) sensor, for example, or an equivalent sensor that determines the location of the vehicle 1 in relation to the external environment of the vehicle 1. The signal may also include information such as direction and speed of the vehicle 1. In this case, the direction and speed may be derived by comparing the global coordinates to their previous counterparts to determine the length of time that the vehicle 1 was traveling between two points. The signal may further include information associated with the coordinates themselves, such as, for example, which country the coordinates are located in, or a designated speed limit of a roadway (e.g., FIGS. 5A and 5B) that the coordinates are located at. Accordingly, the navigational sensor 7 may transmit this information, including the designated speed limit to the CPU 3 of the vehicle 1.

Figure 5B:
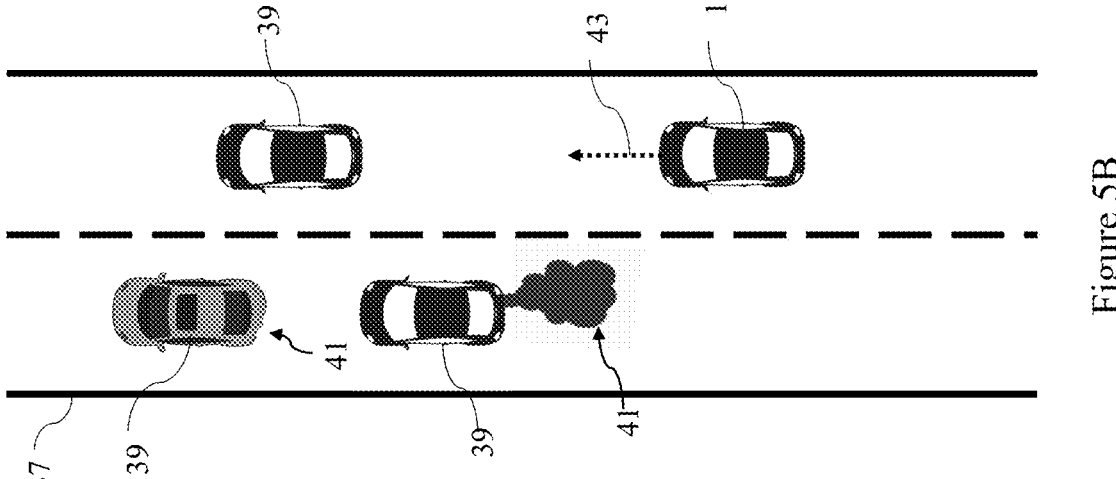
FIGS. 5A and 5B show a visualization of a process in accordance with one or more embodiments disclosed herein.
Figure 5A:
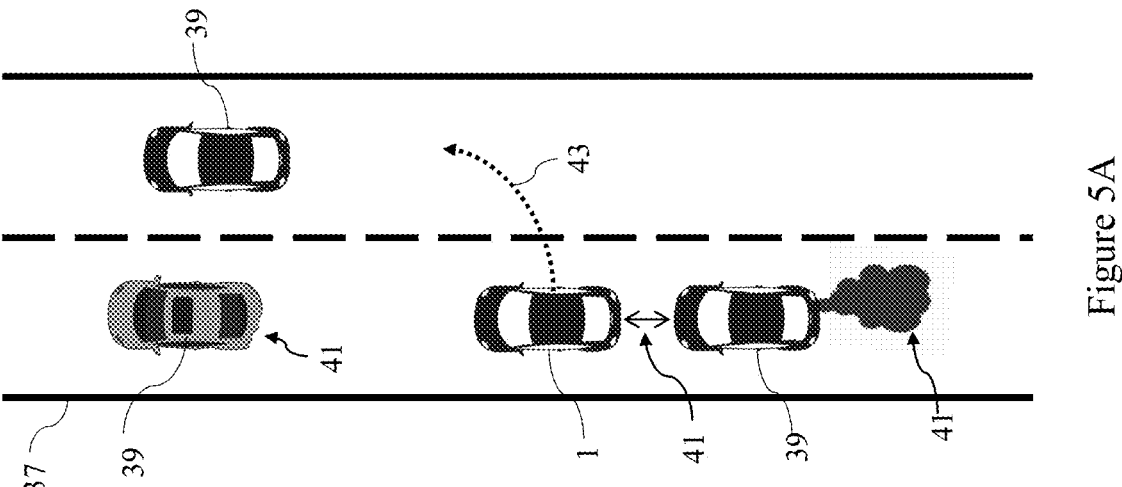

The CPU 3 may be formed of one or more processors, microprocessors, or equivalent computing structures, and further serves to assist a user of the vehicle 1 during an autonomous or semi-autonomous driving process (e.g., FIGS. 5A and 5B). In one or more embodiments, the autonomous or semi-autonomous driving process may include an autonomous or semi-autonomous parking process (e.g., FIGS. 6A-6C). Accordingly, during an autonomous or semi-autonomous driving process, the CPU 3 may be employed to control the movements of the vehicle 1 for the user automatically or upon request of the user. Semi-autonomous driving is understood to mean, for example, that the CPU 3 of the vehicle 1 controls a steering apparatus and/or an automatic gear selection system. Fully autonomous driving is understood to mean, for example, that the CPU 3 additionally controls a drive device and a braking device. Accordingly, the CPU 3 may control the steering, braking, and any gear changes required by the vehicle 1 to travel to a desired destination of the user and/or park into or exit a parking space (e.g., FIGS. 6A-6C).

Further, the CPU 3 receives and processes the data associated with the surrounding vehicles that is captured by the plurality of detection sensors 5. Based on this data received from the plurality of detection sensors 5, the CPU 3 further serves to generate and transmit safety scores of the surrounding vehicles within the external environment of the vehicle 1 and associated instructions to a user of the vehicle 1 and to other components of the vehicle 1, such as the dashboard 9. The data associated with the surrounding vehicles received from the plurality of detection sensors 5 may be in the form of a video feed captured by at least one visual sensor and/or an audio feed captured by at least one audio sensor. As such, upon receiving the data associated with the surrounding vehicles, the CPU 3 analyzes the data and determines safety concerns (e.g., FIGS. 5A and 5B) associated with the surrounding vehicles. Safety concerns of surrounding vehicles may be visual-based (i.e., damage-based, movement-based, light emission-based, etc.) safety concerns and/or audio-based safety concerns, and are further discussed in FIGS. 2 and 3, respectively.

Subsequent to the determination of safety concerns, the CPU 3 calculates a safety score of each surrounding vehicle located within a predetermined distance from the vehicle 1 based on the safety concerns of each surrounding vehicle. Accordingly, the CPU 3 updates the instructions of the vehicle 1 based on the safety scores of the surrounding vehicles. In this way, the CPU 3 may increase the safety of the vehicle 1 by distancing or positioning the vehicle 1 along the roadway away from surrounding vehicles assigned safety scores within or outside a predetermined range. To this end, the CPU 3 utilizes safety scores to recognize surrounding vehicles under the control of careless or accident-prone drivers. By updating the instructions of the vehicle 1 to avoid or keep distance from certain surrounding vehicles based on their safety scores, the CPU 3 may prevent accidents between these surrounding vehicles and the vehicle 1.

Figures 6A, 6B, 6C:
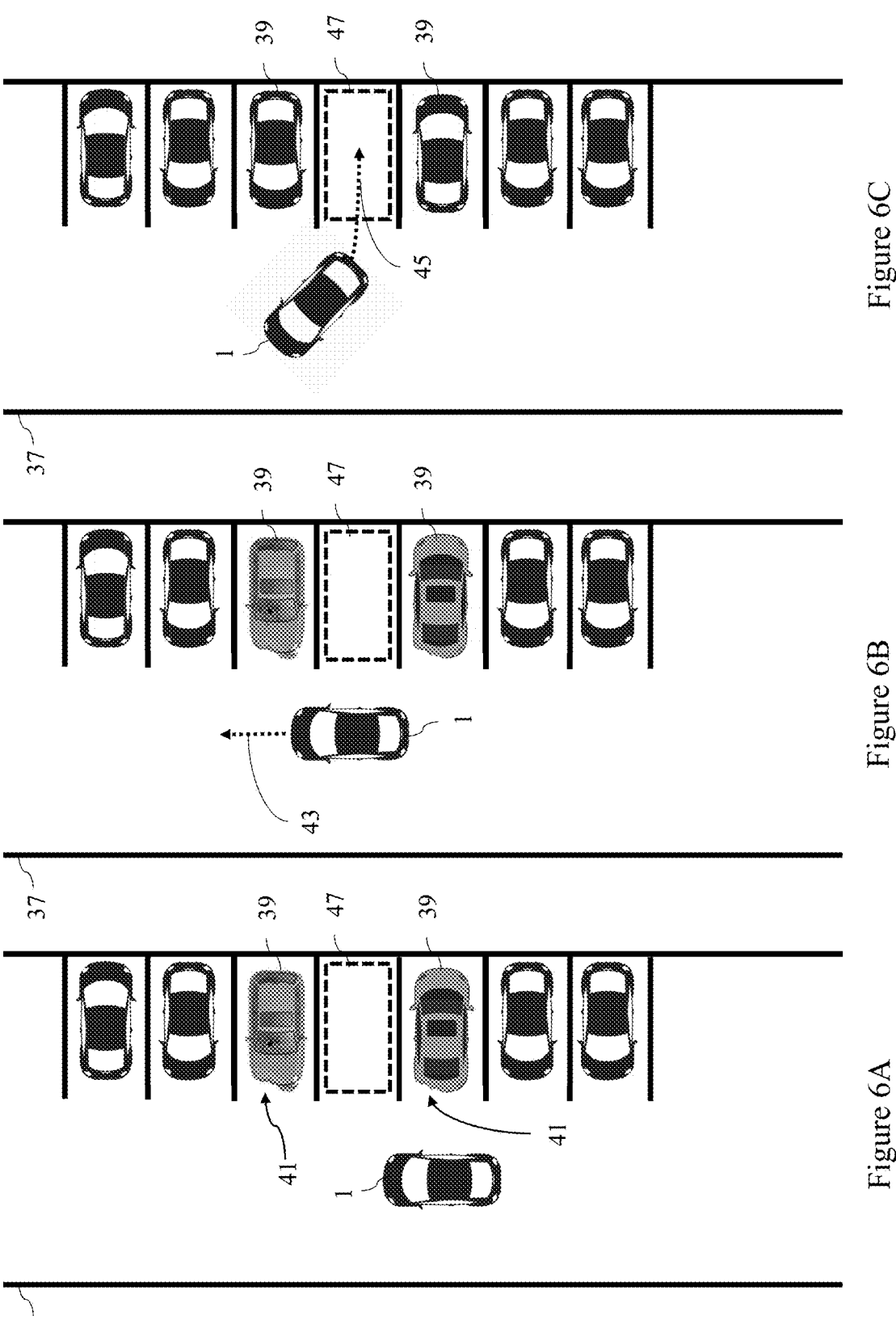
FIGS. 6A-6C show a visualization of a process in accordance with one or more embodiments disclosed herein.

The instructions from the CPU 3 may include driving trajectories (e.g., FIGS. 5A and 5B) and/or parking trajectories (e.g., FIGS. 6A-6C). As such, the instructions may be presented to a user of the vehicle 1 via the dashboard 9, which is a display such as a Liquid Crystal Display (LCD), an Organic Light-Emitting Diode (OLED) display, a quantum dot display, or equivalent display that is configured to present the user with information received from the CPU 3.

Figure 2:
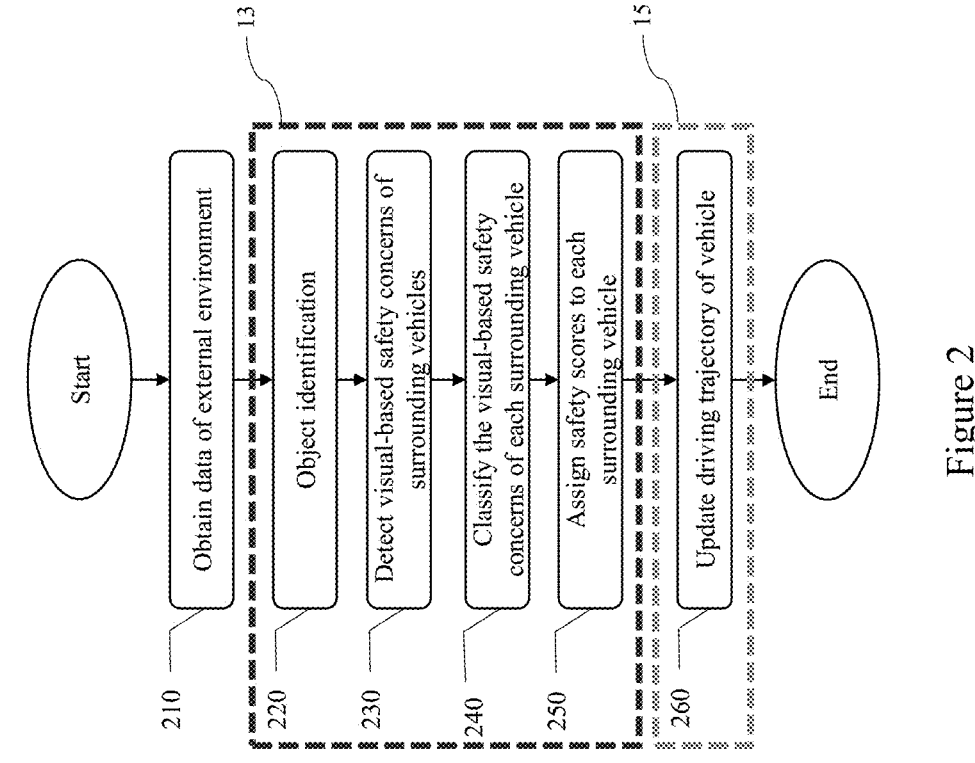
FIG. 2 shows a flowchart of a method in accordance with one or more embodiments disclosed herein.

FIG. 2 shows a flowchart 200 of a method for updating the instructions of a vehicle 1 based on data collected of the external environment of the vehicle 1, in accordance with one or more embodiments. Execution of one or more steps in FIG. 2 may involve one or more components of the system as described in FIG. 1. While the various steps in FIG. 2 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The operations implementing the described steps may be represented by electronically-readable instructions, such as software code, firmware code, etc., which may be stored on one more non-transitory media.

In Step 210, data associated with surrounding vehicles within the external environment of the vehicle 1 are obtained by a plurality of detection sensors 5 and transmitted (i.e., via the bus 11 or wirelessly) to the CPU 3. For the method described in FIG. 2, the collected data includes visual data (i.e., video feeds, series of image frames, etc.) obtained by one or more visual sensors (i.e., two dimensional camera, three dimensional or stereoscopic camera, radar unit, LiDAR unit, ultrasonic sensor, etc.) of the plurality of detection sensors 5 as previously described. Further, in one or more embodiments, navigational information is transmitted (i.e., via the bus 11 or wirelessly) to the CPU 3 by the navigational sensor 7.

Step 210 may involve pre-processing that is specific to one or more visual sensors. For example, a series of image frames obtained from a visual sensor may be pre-processed to eliminate distortions, such as distortions typical for fisheye cameras. That is, a cropping of each image frame may be performed to obtain a series of rectangular image frames of the content of interest. Any other preprocessing such as brightness, contrast correction, compression, resizing, etc. may be performed.

In Steps 220-250, the CPU 3 employs a Visual-based Scoring Model (VSM) 13, a machine learned model, in order to determine and assign safety scores to each surrounding vehicle within a predetermined distance from the vehicle 1. That is, the visual data collected by the visual sensors is the input into the VSM 13, and safety scores of each surrounding vehicle is the output of the VSM 13.

Careless, aggressive, and/or accident-prone drivers may often be easily identified by their rash driving style or by their automobile itself due to the body damage on the automobile. In this way, if a surrounding vehicle has damage along its body, it may be assumed that the surrounding vehicle was involved in an accident. Therefore, by altering the driving trajectory of vehicle 1 in order to distance or position the vehicle 1 away from surrounding vehicles with unsafe drivers, the CPU 3 may improve the safety of the vehicle 1. Accordingly, in one or more embodiments, the VSM 13 assigns safety scores to surrounding vehicles based on the detected damage, movements, light emissions, and/or any other suitable characteristic of a surrounding vehicle that may be visually detected.

In Step 220, the CPU 3 utilizes the VSM 13 to detect surrounding vehicles within the external environment of the vehicle 1 from the visual data obtained by one or more visual sensors. The VSM 13 may utilize image by image processing techniques known to those of ordinary skill in the art. Specifically, features of pixels in one or more image frames may be evaluated to determine whether surrounding vehicles are located within the external environment of the vehicle 1.

The image processing of the VSM 13 may also include a depth estimation utilizing data captured by one or more visual sensors of the plurality of detection sensors 5, such as a stereoscopic or mono camera, a radar unit, a LiDAR unit, an ultrasonic sensor. In one or more embodiments, the resulting output of the image processing by the VSM 13 includes a semantic segmentation, visual odometry, motion segmentation, and/or object detection of the surrounding vehicles.

In Step 230, the visual data obtained from the one or more visual sensors is further processed by the VSM 13 to identify safety concerns of each detected surrounding vehicle within a predetermined distance from the vehicle 1. Surroundings of the vehicle may include each lane to the left and right of the vehicle, the front of the vehicle, and the back of the vehicle, in some instances. Each surrounding vehicle detected may be determined to present zero or more safety concerns.

In one or more embodiments, the visual data is further processed by the VSM 13 to identify safety concerns related to damage detected on the surrounding vehicles. Examples of damage to the surrounding vehicles that may be identified include, but are not limited to, scratches, chips, cracks, dents, holes, tears, missing parts, gaps caused by open parts that should be closed, broken parts, and dislocated parts. Further, damage may be detected along the body or glass of a surrounding vehicle.

In one or more embodiments, the visual data is further processed by the VSM 13 to identify safety concerns related to the presence or absence of light emitted by the surrounding vehicles. For example, dim or non-functioning headlights or taillights of a surrounding vehicle, the absence of headlights during certain times of the day or weather conditions, the presence of hazard lights by a surrounding vehicle, etc. may be defined as safety concerns.

In one or more embodiments, the visual data is further processed by the VSM 13 to identify safety concerns related to the detected make and model of a surrounding vehicle. For example, the identification of automobile models over a certain age may be considered as a safety concern since older automobiles are often driven by younger and/or less experienced drivers due to their value.

In one or more embodiments, the visual data is further processed by the VSM 13 to identify safety concerns related to the movements (i.e., position, speed, direction, etc.) of the surrounding vehicles. Specifically, the VSM 13 analyzes the spatial relationship of the identified surrounding vehicles to the vehicle 1 and/or monitors the movements of the surrounding vehicles within the identified boundaries of the roadway and according to the designated speed limit of the roadway in order to identify safety concerns of each detected surrounding vehicle. In this way, the VSM 13 identifies hazardous movements performed by the surrounding vehicles as safety concerns. Examples of hazardous movements that may be identified include, but are not limited to, speeding, accelerating or decelerating at a rate above a predetermined value, swerving, veering in and/or out of lanes of the roadway, and being within a certain distance of the vehicle 1.

In Step 240, each safety concern identified upon a surrounding vehicle is classified by the VSM 13. In one or more embodiments, with respect to damage-based safety concerns, the VSM 13 categorizes each individual damage detected upon a surrounding vehicle. Examples of damage categories include, but are not limited to, the type of damage (i.e., scratches, chips, cracks, dents, etc.), the location of the damage along the surrounding vehicle (i.e., front, rear, side, etc.), the part of surrounding vehicle the damage is located upon (i.e., door, hood, bumper, window, etc.), and the size of the damage (i.e., small, medium, large, etc.).

Differing weights may be assigned to each option of a damage category in order to signify the level of significance of the damage. For example, a dent may be weighted greater than a scratch, as a dent more likely suggests that the surrounding vehicle was involved in an accident. In another example, a dent on the front of a surrounding vehicle may be weighted greater than a dent on the side of a surrounding vehicle, as a dent on the front of a surrounding vehicle more likely suggests that the surrounding vehicle was responsible for an accident causing the dent, while the dent on the side of a surrounding vehicle may suggest that the surrounding vehicle did not cause the accident that made the dent. The value of each weight may be predetermined by the user of the vehicle 1.

In one or more embodiments, each type of hazardous movement (i.e., rate of acceleration/deceleration, speeding, swerving, etc.) may be weighted differently according to a user of the vehicle 1 in order to signify the level of significance of the hazardous movement. For example, swerving may be weighted greater than decelerating at a rate above a predetermined value, as swerving may indicate that the driver of the swerving surrounding vehicle is distracted while decelerating at a high rate may be unavoidable in order to prevent an accident.

Similarly, safety concerns based on light emissions may be weighted differently according to a user of the vehicle 1 in order to signify the level of significance of the light emission. For example, the presence of hazard lights may be weighted greater than a single dim taillight, as hazard lights may indicate that the surrounding vehicle isn't performing properly while a surrounding vehicle with a single dim taillight may still have another taillight that is properly working.

In one or more embodiments, the safety concerns may further be weighted based on their frequency of occurrence. For example, if a safety concern based on the movement of a surrounding vehicle is repeatedly detected over a predetermined period of time, a multiplier is applied to the value of the safety concern in order to signify the growing level of danger of the associated surrounding vehicle.

In Step 250, the VSM 13 assigns a safety score to each detected surrounding vehicle within a predetermine distance from the vehicle 1. In one or more embodiments, each type of safety concern (i.e., damage-based, movement-based, light emission-based, etc.) is assigned a predetermined value. In one or more embodiments the predetermined value of each safety concern may be different for each type of safety concern.

The predetermined values of each safety concern are then multiplied by the weights assigned to the respective safety concerns during the classification of the safety concerns in order to create a safety score. In one non-limiting example, the safety score of a surrounding vehicle may be a value ranging from "0-100" (inclusive), where a value of "0" means that the surrounding vehicle has been determined to be an unsafe surrounding vehicle, and a value of "100" indicates that the surrounding vehicle has been determined to be a safe surrounding vehicle. In one non-limiting example, the weight of a safety concern may be a value ranging from "1-5" (inclusive), where a value of "1" means that the classification of the safety concern assigned to the weight is of little to no importance or danger, and a value of "5" indicates that the classification of the safety concern assigned to the weight is extremely significant or dangerous. As such, the safety score of a surrounding vehicle may be calculated by the function:

$$\text{Safety Score} = 100 - ((SC_1 \times W_1) + (SC_2 \times W_2) + \ldots + (SC_n \times W_n)), \quad (1)$$

where $SC_x$ is the value of each safety concern and $W_x$ is the product of all the weights associated with the respective safety concern. For example, if $SC_1$ is 10 (representing a damage-based safety concern) and $W_1$ is the product of 1.20, 1.25, 1.15, and 1.30 (representing the classifications of "type: dent", "location: front", "part: bumper", and "size: large", respectively), and $SC_2$ is 12 (representing a movement-based safety concern) and $W_2$ is the product of 2.00 and 1.50 (representing the weights of "type: swerving" and "frequency: 3 times in the last 5 minutes", respectively), then $SC_1W_1$ and $SC_2W_2$ would amount to 22.43 and 36.00, respectively. Accordingly, the safety score of this surrounding vehicle would be 41.57. In the instance that the VSM 13 detected no safety concerns for a surrounding vehicle, the surrounding vehicle may be given a safety score of 100.

In one or more embodiments, the safety score of a surrounding vehicle may be weighted based on the amount of safety concerns detected. That is, a multiplier may be applied to the safety score of a surrounding vehicle if the surrounding vehicle has more than a predetermined number of safety concerns.

In Step 260, the CPU 3 employs a Driving Trajectory Model (DTM) 15, an additional machine learned model, in order to determine and update a driving trajectory of the vehicle 1 based on the safety scores of each surrounding vehicle within a predetermined distance from the vehicle 1. The DTM 15 utilizes the safety scores of each surrounding vehicle determined by the VSM 13 and data captured by the plurality of detection sensors 5 as inputs. As such, the DTM 15 outputs instructions of an updated driving trajectory for the vehicle 1 that the vehicle 1 may follow autonomously or semi-autonomously. In one or more embodiments, the updated driving trajectory of the vehicle 1 may include an updated parking trajectory.

As such, in Step 260, the DTM 15 determines whether the current driving/parking trajectory of the vehicle 1 should be maintained or altered based on the safety scores of the surrounding vehicles. In one or more embodiments, the DTM 15 may alter the driving/parking trajectory of the vehicle 1 based on a plurality of predetermined ranges that the value of the safety score of a surrounding vehicle falls within. For example, in the instance that the safety score of a surrounding vehicle falls within a first range (e.g., a range of "100-80"), the DTM 15 may maintain the current driving/parking trajectory of the vehicle 1. In the instance that the safety score of a surrounding vehicle falls within a second range (e.g., a range of "79-50"), the DTM 15 may enact a first maneuver in order to alter the driving/parking trajectory of the vehicle 1. In the instance that the safety score of a surrounding vehicle falls within a third range (e.g., a range of "49-0"), the DTM 15 may enact a second maneuver in order to alter driving/parking trajectory of the vehicle 1. In one or more embodiments, the DTM 15 may enact a plurality of maneuvers based on the safety score of a surrounding vehicle or the range in which a safety score of a surrounding vehicle is located within. Examples of maneuvers that may be employed in order to alter a driving/parking trajectory of a vehicle 1 may include, but are not limited to, increasing/decreasing the speed of the vehicle 1, accelerating/decelerating, increasing/decreasing the distance between the vehicle 1 and a surrounding vehicle, stopping, yielding, changing lanes of the roadway, and pulling off the roadway.

In the instance that multiple surrounding vehicles are located within a predetermined distance from the vehicle 1 (e.g., while traveling along a multi-laned roadway, searching for a parking space in a parking lot of a busy shopping center, etc.), the DTM 15 may alter the driving/parking trajectory of the vehicle 1 based on the surrounding vehicle with the lowest safety score. In one or more embodiments, the DTM 15 alters the driving/parking trajectory of the vehicle 1 based on which portion of the roadway (e.g., lane, side of parking lot, etc.) includes surrounding vehicles with lower safety scores. In one or more embodiments, the DTM 15 alters the driving/parking trajectory of the vehicle 1 based on the surrounding vehicle that is located nearest to the vehicle 1. In one or more embodiments, the DTM 15 alters the driving/parking trajectory of the vehicle 1 by performing maneuvers until all of the surrounding vehicles within a predetermined distance from the vehicle 1 have safety scores above a certain threshold.

In one or more embodiments, the DTM 15 utilizes data obtained by the plurality of detection sensors 5 to update the driving/parking trajectory of the vehicle 1. That is, the DTM 15 may employ image processing on visual data captured by visual sensors of the vehicle 1 which output a depth estimation, semantic segmentation, visual odometry, motion segmentation, and/or object detection. In one or more embodiments, the DTM 15 receives this information from the VSM 13. Examples of objects that may be identified include, but are not limited to, roadways, lane marks, curbs, surrounding vehicles, pedestrians, and traffic signs. In addition, the DTM 15 may receive and utilize navigational information from the navigational sensor 7 of the vehicle 1 to determine an accurate estimate of the current position, speed, and/or orientation of the vehicle 1 and the geometry and designated speed limit of the current roadway of the vehicle 1. In this way, in one or more embodiments, the DTM 15 utilizes the position, orientation, movement, etc. of detected objects in the determination of an updated driving/parking trajectory of the vehicle 1.

Following Step 260, the method may restart at Step 210 to employ the latest data detected by the plurality of detection sensors 5, as well as the latest navigational information received by the navigational sensor 7 from the signal connection in order to ensure that the current driving/parking trajectory is the safest driving/parking trajectory of the vehicle 1.

In one or more embodiments, the value of a weight applied to a safety concern based on the frequency of occurrence of the safety concern over a period of time may increase or decrease as time passes. To this end, the safety score of a surrounding vehicle as determined by the method of FIG. 2 may increase or decrease as time passes.

Figure 3:
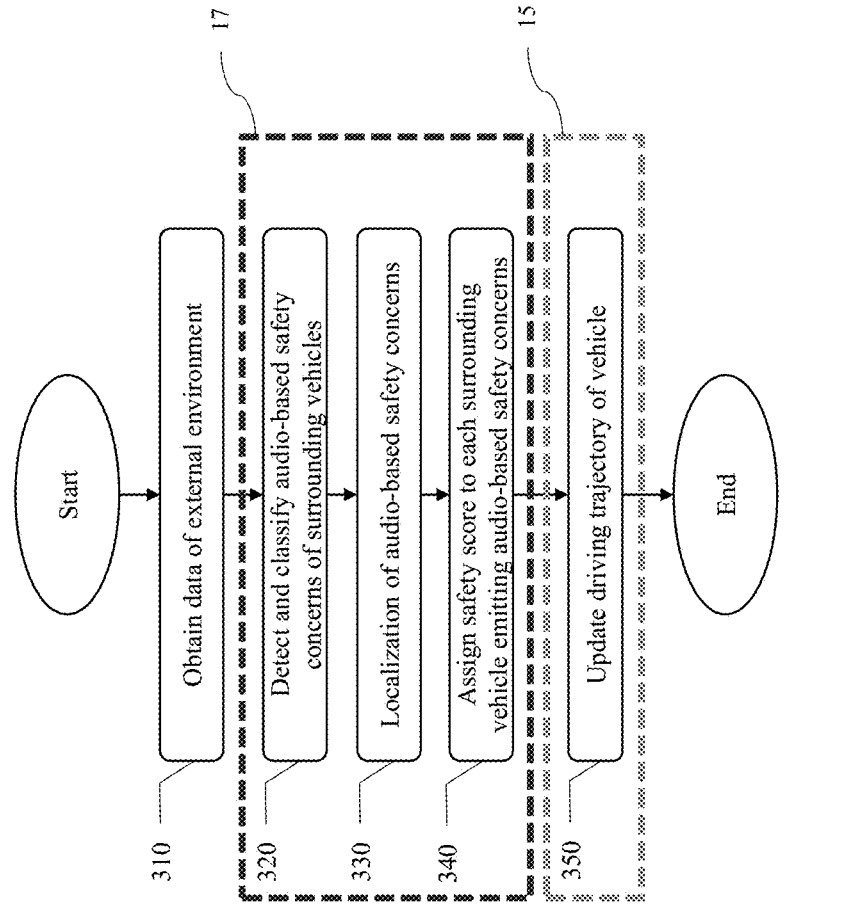
FIG. 3 shows a flowchart of a method in accordance with one or more embodiments disclosed herein.
Figure 3:

FIG. 3 shows a flowchart 300 of a method for updating the instructions of a vehicle 1 based on data collected of the external environment of the vehicle 1, in accordance with one or more embodiments. Execution of one or more steps in FIG. 3 may involve one or more components of the system as described in FIG. 1. While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively. The operations implementing the described steps may be represented by electronically-readable instructions, such as software code, firmware code, etc., which may be stored on one more non-transitory media.

In Step 310, data associated with surrounding vehicles within the external environment of the vehicle 1 are obtained by a plurality of detection sensors 5 and transmitted (i.e., via the bus 11 or wirelessly) to the CPU 3. For the method described in FIG. 3, the collected data includes audio data obtained by one or more audio sensors, such as a microphone, of the plurality of detection sensors 5 as previously described. In one or more embodiments, the vehicle 1 includes a sound processor (not shown) that performs preprocessing of the audio data captured by the audio sensors. Examples of preprocessing performed by the sound processor may include, but are not limited to, implementing a low-pass filter, a high-pass filter, an amplifier, and an analog-to-digital converter. Subsequently, the preprocessed audio data is transmitted (i.e., via the bus 11 or wirelessly) to the CPU 3 of the vehicle 1. In one or more embodiments, preprocessing of the audio data may be performed by the CPU 3 itself.

In Steps 320-350, the CPU 3 employs a Sound Scoring Model (SSM) 17, a machine learned model, in order to determine and assign safety scores to each surrounding vehicle within a predetermined distance from the vehicle 1 based on the sounds emitted by each surrounding vehicle. That is, audio data collected of the external environment of the vehicle 1 by one or more audio sensors of the vehicle 1 is input into the SSM 17, and subsequently, the SSM 17 outputs safety scores of each surrounding vehicle determined to have emitted a sound. In one or more embodiments, the SSM 17 outputs safety scores of each surrounding vehicle determined to have emitted a sound above a predetermined decibel threshold.

In one or more embodiments, the vehicle 1 includes a plurality of audio sensors arranged in differing positions and/or directions. As such, in Step 320, the audio data captured by each of the plurality of audio sensors (e.g., a first audio data set captured by a first audio sensor, a second audio data set captured by a second audio sensor, etc.) is separated into one or more audio segments by the sound processor, the CPU 3, or a device with similar capabilities. The one or more audio segments each correlate to the same recorded time period and may include sounds emitted by surrounding vehicles. Subsequently, the audio segments are transformed (e.g., via a Fast Fourier Transformation, Constant-Q Transformation, Mel Frequency Cepstral Coefficients, etc.) from a time domain to a frequency domain in order to generate spectrograms. In one or more embodiments, the audio segments may be clipped into subsets based on a predetermined frequency threshold such that only audio data containing a frequency above the threshold is analyzed. The spectrograms are then analyzed by the SSM 17 to detect sounds associated with surrounding vehicles present in the audio segments. More specifically, the SSM 17 is configured to detect alarming sounds associated with audio-based safety concerns present in the audio segments. Examples of audio-based safety concerns may include, but are not limited to, engine and exhaust noises, tires screeching, worn brakes, honks, alarms, and sirens. In the instance that one or more audio-based safety concerns are detected, the method continues to Step 330. However, in the instance that no audio-based safety concerns are detected, the method may end or reset to employ the latest audio data captured by the one or more audio sensors.

In Step 330, a localization process is performed by the SSM 17 in order to identify the one or more surrounding vehicles that are the source of the audio-based safety concerns. Specifically, the localization process of the SSM 17 estimates the position (i.e., direction and/or distance relative to the vehicle 1) of the audio source. In one or more embodiments, the localization process may be performed by utilizing localization techniques such as acoustic triangulation, trilateration, multilateration, angle of arrival estimation, and/or other techniques known to a person of ordinary skill in the art.

The SSM 17 may further employ the data collected by the visual sensors of the plurality of detection sensors 5 in order to assist or corroborate in the identification of the audio source. Specifically, the SSM 17 may analyze the data obtained by the visual sensors to detect surrounding vehicles within the estimated position of an audio source determined by the localization process. The SSM 17 may utilize image by image processing techniques known to those of ordinary skill in the art in order to perform object detection, depth estimation, semantic segmentation, visual odometry, and/or motion segmentation.

In Step 340, the SSM 17 assigns a safety score to each surrounding vehicle within a predetermined distance from the vehicle 1 determined to be emitting one or more audio-based safety concerns. In one or more embodiments, each safety concern of a surrounding vehicle is assigned a predetermined value. Then, the values of each safety concern are multiplied by a weight assigned to the respective safety concern. In one or more embodiments, each type of audio-based safety concern (i.e., engine and exhaust noises, tires screeching, worn brakes, honks, etc.) may be weighted differently according to a user of the vehicle 1 in order to signify the level of significance of the action causing the audio-based safety concern. For example, honking may be weighted greater than noisy brake pads, as honking may suggest the respective surrounding vehicle is being controlled by an aggressive driver while the brake pads of a surrounding vehicle may only be noisy during certain weather conditions.

In one or more embodiments, the safety concerns may further be weighted based on their frequency of occurrence. That is, in the instance that an audio-based safety concern is repeatedly detected over a predetermined period of time, a multiplier is applied to the value of the safety concern in order to signify the growing level of danger of the associated surrounding vehicle. Thus, in one or more embodiments, the safety score of a surrounding vehicle may be calculated by Equation (1) above.

In Step 350, the CPU 3 employs the DTM 15, in order to determine and update a driving/parking trajectory of the vehicle 1 based on the safety scores of each surrounding vehicle within a predetermined distance from the vehicle 1 as described above in Step 260 of the method of FIG. 2. However, in the method of FIG. 3, the DTM 15 utilizes the safety scores of each surrounding vehicle determined by the SSM 17.

Following Step 350, the method may restart at Step 310 to employ the latest data captured by the plurality of detection sensors 5, as well as the latest navigational information received by the navigational sensor 7 from the signal connection in order to ensure that the current driving/parking trajectory is the safest driving/parking trajectory of the vehicle 1. Further, the value of a weight applied to a safety concern based on the frequency of the occurrence of the safety concern over a period of time may increase or decrease as time passes. To this end, the safety score of a surrounding vehicle as determined by the method of FIG. 3 may increase or decrease as time passes.

In addition, in the instance that lights or sounds of a siren of an emergency vehicle (not shown) are detected by the VSM 13 or SSM 17, respectively, the driving/parking trajectory of the vehicle 1 may be altered without assigning a safety score to the emergency vehicle. Accordingly, the DTM 15 may direct the vehicle 1 to reduce speed, change lanes, pull off the roadway, stop, yield, and/or take any other suitable action depending on the type of emergency vehicle, the locations of the emergency vehicle and the vehicle 1 on the roadway, and the direction the emergency vehicle is determined to be traveling.

In accordance with one or more embodiments, a series of one or more machine learned models (i.e., the VSM 13, the SSM 17, and/or the DTM 15) is applied to data acquired by a plurality of detection sensors 5 disposed along a vehicle 1. In one or more embodiments, one or more machine learned models are applied to visual data in order to determine the position, orientation, movement, etc. of detected objects (i.e., surrounding vehicles, roadways, lane marks, curbs, pedestrians, traffic signs, etc.). In one or more embodiments, one or more machine learned models are applied to visual data acquired using visual sensors to detect, identify, and/or classify visual-based safety concerns associated with surrounding vehicles detected in the external environment of the vehicle 1. Further, in one or more embodiments, one or more machine learned models are applied to audio data acquired using audio sensors to detect, identify, and/or classify audio-based safety concerns associated with surrounding vehicles detected in the external environment of the vehicle 1.

In one or more embodiments, the result of one or more machine learned models are safety scores assigned to each surrounding vehicle within a predetermined distance from the vehicle 1 based on the safety concerns detected, identified, and/or classified. Further, in one or more embodiments, the result of one or more machine learned models are instructions of an updated driving/parking trajectory for the vehicle 1 based on the safety scores of the surrounding vehicles within the predetermined distance from the vehicle.

Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine learned, will be adopted herein, however, one skilled in the art will recognize that the concepts and methods detailed hereafter are not limited by this choice of nomenclature.

One with ordinary skill in the art will recognize that the field and concepts encompassed by machine learning are both too broad and too deep to be given an adequate description herein. However, to provide requisite context for some of the machine learned methods employed by one or more embodiments of the present invention, a minimal description of neural networks and convolutional neural networks is given in the following paragraphs. It is emphasized that the following descriptions are intended to provide a cursory understanding of some machine learned methods and should not be considered limiting on the present disclosure.

Figure 4:
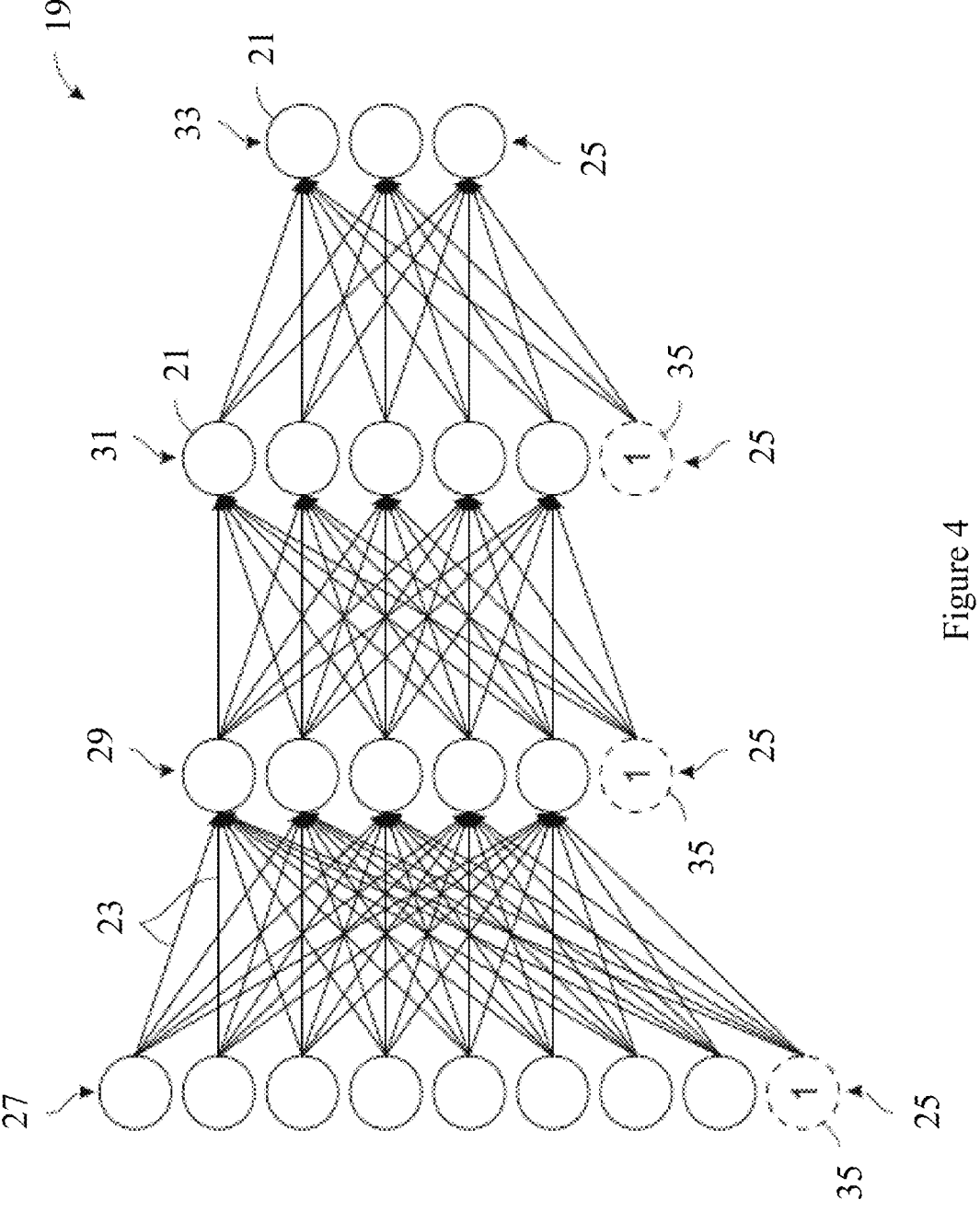
FIG. 4 shows a neural network in accordance with one or more embodiments disclosed herein.

One type of machine learned model is a neural network 19. A neural network 19 may often be used as a subcomponent of a larger machine learned model. A diagram of a neural network 19 is shown in FIG. 4. At a high level, a neural network 19 may be graphically depicted as being composed of nodes 21, where in FIG. 4 any circle represents a node 21, and edges 23 are depicted as directed lines. The nodes 21 may be grouped to form layers 25. FIG. 4 displays four layers 27, 29, 31, 33 of nodes 21 where the nodes 21 are grouped into columns, however, the grouping need not be as shown in FIG. 4. The edges 23 connect the nodes 21. Edges 23 may connect, or not connect, to any node(s) 21 regardless of which layer 25 the node(s) 21 is in. That is, the nodes 21 may be sparsely and residually connected. However, when every node 21 in a layer 25 is connected to every node 21 in an adjacent layer 25, the layer 25 is said to be densely connected. If all layers 25 in a neural network 19 are densely connected, the neural network 19 may be said to be a dense, or densely connected, neural network 19. A neural network 19 will have at least two layers 25, where the first layer 27 is considered the "input layer" and the last layer 33 is the "output layer". Any intermediate layer 29, 31 is usually described as a "hidden layer". A neural network 19 may have zero or more hidden layers 29, 31 and a neural network 19 with at least one hidden layer 29, 31 may be described as a "deep neural network" or a "deep learning method". As such, in some embodiments, the machine learned model is a deep neural network. In general, a neural network 19 may have more than one node 21 in the output layer 33. In this case the neural network 19 may be referred to as a "multi-target" or "multi-output" network.

Nodes 21 and edges 23 carry additional associations. Namely, every edge 23 is associated with a numerical value. The edge numerical values, or even the edges 23 themselves, are often referred to as "weights" or "parameters". While training a neural network 19, numerical values are assigned to each edge 23. Additionally, every node 21 is associated with a numerical variable and an activation function. Activation functions are not limited to any functional class, but traditionally follow the form:

$$A = f\left(\sum_{i \in (incoming)} [(\text{node value})_i \ (\text{edge value})_i]\right), \qquad (2)$$

where i is an index that spans the set of "incoming" nodes 21 and edges 23, and f is a user-defined function.

Incoming nodes 21 are those that, when viewed as a graph (as in FIG. 4), have directed arrows that point to the node 21 where the numerical value is being computed. Some functions for $f$ may include the linear function $f(x)=x$, sigmoid function $$f(x) = \frac{1}{1 + e^{-x}},$$

and rectified linear unit function $f(x)=(0, x)$, however, many additional functions are commonly employed. Every node 21 in a neural network 19 may have a different associated activation function. Often, as a shorthand, activation functions are described by the function $f$ by which it is composed. That is, an activation function composed of a linear function $f$ may simply be referred to as a linear activation function without undue ambiguity.

When the neural network 19 receives an input, the input is propagated through the network according to the activation functions and incoming node 21 values and edge 23 values to compute a value for each node 21. That is, the numerical value for each node 21 may change for each received input. Occasionally, nodes 21 are assigned fixed numerical values, such as the value of "1", that are not affected by the input or altered according to edge 23 values and activation functions. Fixed nodes 21 are often referred to as "biases" or "bias nodes" 35, displayed in FIG. 4 with a dashed circle.

In some implementations, the neural network 19 may contain specialized layers 25, such as a normalization layer (batch or layer-wise normalization may occur) or a dropout layer, or additional connection procedures, like concatenation. One skilled in the art will appreciate that these alterations do not exceed the scope of this disclosure.

As noted, the training procedure for the neural network 19 comprises assigning values to the edges 23. To begin training the edges 23 are assigned initial values. These values may be assigned randomly, assigned according to a prescribed distribution, assigned manually, or by some other assignment mechanism. Once edge 23 values have been initialized, the neural network 19 may act as a function, such that it may receive inputs and produce an output. As such, at least one input is propagated through the neural network 19 to produce an output. A given data set may be said to be composed of inputs and associated target(s), where the target(s) represent the "ground truth", or the otherwise desired output. Such a data set is provided to the neural network 19 for training. The inputs are processed by the neural network 19 and the output of the neural network 19 is compared to the associated target(s) of the input data. The comparison of the neural network 19 output to the target(s) is typically performed by a so-called "loss function"; although other names for this comparison function such as "error function", "objective function", "value function", and "cost function" are commonly employed. Many types of loss functions are available, such as the mean squared error function, however, the general characteristic of a loss function is that the loss function provides a numerical evaluation of the similarity between the neural network 19 output and the associated target(s). The loss function may also be constructed to impose additional constraints on the values assumed by the edges 23, for example, by adding a penalty term, which may be physics-based, or a regularization term. Generally, the goal of a training procedure is to alter the edge

23 values to promote similarity between the neural network 19 output and associated target(s) over the data set. Thus, the loss function is used to guide changes made to the edge 23 values, typically through a process called "backpropagation".

While a full review of the backpropagation process exceeds the scope of this disclosure, a brief summary is provided. Backpropagation consists of computing the gradient of the loss function over the edge 23 values. The gradient indicates the direction of change in the edge 23 values that results in the greatest change to the loss function. Because the gradient is local to the current edge 23 values, the edge 23 values are typically updated by a "step" in the direction indicated by the gradient. The step size is often referred to as the "learning rate" and need not remain fixed during the training process. Additionally, the step size and direction may be informed by previously seen edge 23 values or previously computed gradients. Such methods for determining the step direction are usually referred to as "momentum" based methods.

Once the edge 23 values have been updated, or altered from their initial values, through a backpropagation step, the neural network 19 will likely produce different outputs. Thus, the procedure of propagating at least one input through the neural network 19, comparing the neural network 19 output with the associated target(s) with a loss function, computing the gradient of the loss function with respect to the edge 23 values, and updating the edge 23 values with a step guided by the gradient, is repeated until a termination criterion is reached. Common termination criteria are: reaching a fixed number of edge 23 updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge 23 values are no longer intended to be altered, the neural network 19 is said to be "trained". It is noted that depending on the construction of the loss function, in some cases similarity between the target(s) and the neural network 19 output may be promoted by minimizing the loss function. In other cases, the objective may be to maximize the loss function (if maximization is the goal, the loss function is usually referred to as an objective or value function). One with ordinary skill in the art will appreciate that tasks of maximization and minimization can be made equivalent through techniques such as negation. In other words, when updating the edge 23 values with a step guided by the gradient, depending on the construction of the loss function, the step may be in the direction of the gradient or in a direction opposite to the gradient.

A machine learned model architecture defines the entire structure of a machine learned model. For example, in the case of a neural network 19, the number of hidden layers in the network, the type of activation function(s) used, and the number of outputs must be specified. Additionally, the use of, and location of, specialized layers such as batch normalization must be defined. Each of these choices, for example, the choice of how many hidden layers are in a neural network 19, is said to be a hyperparameter of the machine learned model. In other words, a machine learned model architecture specifies the hyperparameters surrounding the machine learned model. Note that a machine learned model architecture does not describe the values of the edges 23 (weights, parameters) of the machine learned model. These must be learned during training or are otherwise specified when using a pre-trained model.

Another type of machine learned model is a convolutional neural network (CNN). A CNN is similar to a neural network 19 in that it can technically be graphically represented by a series of edges and nodes grouped to form layers. However, it is more informative to view a CNN as structural groupings of weights; where here the term "structural" indicates that the weights within a group have a relationship. CNNs are widely applied when the data inputs also have a structural relationship, for example, a spatial relationship where one input is always considered "to the left" of another input. For example, an image has a structural relationship as each pixel has a directional relationship with respect to its adjacent pixels. Consequently, CNNs are particularly apt at processing images.

A structural grouping, or group, of weights is herein referred to as a "filter". The number of weights in a filter is typically much less than the number of inputs. In a CNN, the filters can be thought as "sliding" over, or convolving with, the inputs to form an intermediate output or intermediate representation of the inputs which still possesses a structural relationship. Like unto the neural network 19, the intermediate outputs are often further processed with an activation function. Many filters may be applied to the inputs to form many intermediate representations. Additional filters may be formed to operate on the intermediate representations creating more intermediate representations. This process may be repeated as prescribed by a user. The filters, when convolving with an input, may move in strides such that some components of the input (e.g., pixels) are skipped. Groupings of the intermediate output representations may be pooled, for example, by considering only the maximum value of a group in subsequent calculations. Strides and pooling may be used to downsample the intermediate representations. Like unto the neural network 19, additional operations such as normalization, concatenation, dropout, and residual connections may be applied to the intermediate representations. Further, intermediate representations may be upsampled, for example, through techniques such as transpose convolution. In a CNN there is a "final" group of intermediate representations, wherein no more filters act on these intermediate representations. Generally, the structural relationship of the final intermediate representations is ablated; a process known as "flattening". The flattened representation is usually passed to a neural network 19, or at least a densely connected layer, to produce the final output. Note, that in this context, the neural network 19 is still considered part of the CNN. Like unto a neural network 19, a CNN is trained, after initialization of the filter weights, and the edge values of the internal neural network 19, if present, with the backpropagation process in accordance with a loss function.

In one or more embodiments, the series of one or more machine learned models (i.e., the VSM 13, the SSM 17, and/or the DTM 15) is trained to detect safety concerns of surrounding vehicles, assign safety scores to the surrounding vehicles, and update a driving trajectory/parking trajectory of the vehicle 1 based on the safety scores of the surrounding vehicles. In one or more embodiments, the training of the one or more machine learned models may employ data of a database and/or data acquired from the plurality of detection sensors 5 of the vehicle 1.

The training of the one or more machine learned models may be performed online or off-line. In an online mode, the one or more machine learned models may access data of a database that has already been filled with data (e.g., video feeds, image frames, audio recordings, etc.) associated with an exterior environment of a vehicle 1, transmitted from other automobiles (e.g., development automobiles) to a cloud server via a mobile network. The actual learning process of the one or more machine learned models may be performed in an off-line mode following the input of data from a database. In one or more embodiments, the data of the database is manually marked or annotated. Further, in one or more embodiments, the training of the one or more machine learned models may also be performed through the acquisition of data associated with the external environment of the vehicle 1 by the plurality of detection sensors 5 of the vehicle 1 that can be used for learning or training the one or more machine learned models, preferably in the off-line mode.

FIGS. 5A and 5B depict a visualization of an autonomous driving process in accordance with one or more embodiments disclosed herein. Specifically, in FIG. 5A, a vehicle 1 is traveling autonomously along a roadway 37 according to a driving trajectory generated by a CPU 3 of the vehicle 1. In this non-limiting example, the roadway 37 includes two lanes for automobiles traveling in the same direction. While the vehicle 1 is traveling on the roadway 37, the plurality of detection sensors 5 capture raw data, such as an area map, a video feed, and/or an audio feed. In this way, the plurality of detection sensors 5 may capture the presence, appearance, movements, and/or sounds of surrounding vehicles 39 on the roadway 37 within a distance of the vehicle 1.

In accordance with one or more embodiments, a series of one or more machine-learned models are applied to the data collected by the plurality of detection sensors 5 to analyze the appearance, movements, and/or sounds of surrounding vehicles 39 within a predetermined distance from the vehicle 1 in order to determine safety concerns 41 associated with each surrounding vehicle 39 and assign a safety score to each surrounding vehicle 39. Further, in one or more embodiment, the series of one or more machine-learned models updates a driving trajectory 43 or parking trajectory of the vehicle 1 based on the safety scores of the surrounding vehicles 39 within the predetermined distance from the vehicle 1.

Here, in FIG. 5A, the plurality of detection sensors 5 of the vehicle 1 have identified a plurality of surrounding vehicles 39. Accordingly, the CPU 3 analyzes the data received from the plurality of detection sensors 5 to identify safety concerns 41 associated with each surrounding vehicle 39 within a predetermined distance from the vehicle 1. The predetermined distance from the vehicle 1 may be determined and/or selected by the user of the vehicle 1 or dependent on the capabilities of the plurality of detection sensors 5. Further, the predetermined distance may be dependent on the speed of the vehicle 1 and/or the geometry of the roadway 37 (i.e., width of the lanes, number of lanes, curvature of roadway 37, etc.).

During the analysis of the data received from the plurality of detection sensors 5 of the vehicle 1, the CPU 3 analyzes the data associated with each surrounding vehicle 39 within the predetermined distance from the vehicle 1. Specifically, the CPU 3 analyzes the data associated with each surrounding vehicle 39 to identify any safety concerns 41 (i.e., visual-based safety concerns 41 and/or audio-based safety concerns 41) of the surrounding vehicles 39.

In FIG. 5A, the CPU 3 of the vehicle 1 has identified safety concerns 41 associated with the surrounding vehicles 39 on the roadway 37. In this non-limiting example, the ECU has identified safety concerns 41 associated with the surrounding vehicle 39 directly in front of the vehicle 1 and the surrounding vehicle 39 directly behind the vehicle 1. Specifically, the CPU 3 has identified a safety concern 41 of the surrounding vehicle 39 directly in front of the vehicle 1 based on damage along the rear of this surrounding vehicle 39. In addition, the CPU 3 has identified a safety concern 41 of the surrounding vehicle 39 directly behind the vehicle 1 based on alarming sounds emitted from the exhaust of this surrounding vehicle 39. Further, the CPU 3 has identified an additional safety concern 41 of the surrounding vehicle 39 directly behind the vehicle 1 based on the distance at which this surrounding vehicle 39 is tailing the vehicle 1. Finally, the CPU 3 has identified no safety concerns 41 associated with the surrounding vehicle 39 within the adjacent lane of the vehicle 1.

Subsequent to identifying and classifying each safety concern 41 of each surrounding vehicle 39, the CPU 3 assigns a safety score to each surrounding vehicle 39. In this non-limiting example, because the surrounding vehicle 39 within the adjacent lane of the roadway 37 was determined to have no safety concerns 41, this surrounding vehicle 39 is assigned a higher safety score than the surrounding vehicles 39 directly in front and behind the vehicle 1. Next, the CPU 3 updates the driving trajectory 43 of the vehicle 1 based on the safety scores of the surrounding vehicles 39 in order to position the vehicle 1 in a safe location along the roadway 37.

In one or more embodiments, the CPU 3 may actuate external warnings of the vehicle 1 based on certain safety concerns 41 identified subsequent to the CPU 3 detecting safety concerns 41 of the surrounding vehicles 39. Actuation of external warnings of the vehicle 1 may include actuating hazard warning lights (not shown) of the vehicle 1 and/or sounding the horn (not shown) of the vehicle 1. In addition, in the case of a manned vehicle 1, the CPU 3 may also actuate internal warnings within the interior of the vehicle 1 to inform a user of the vehicle 1. Specifically, internal warnings of the vehicle 1 may include audible sounds and haptic feedback for a user of the vehicle 1. For example, the CPU 3 may inform the user of a certain safety concern 41 identified or that a surrounding vehicle 39 has been assigned a safety score below a predetermined threshold via a sound system (not shown) of the vehicle 1 and/or one or more components of the steering wheel (not shown) that causes the steering wheel to generate haptic feedback, such as a vibration.

In FIG. 5A, the CPU 3 determined an updated driving trajectory 43 for the vehicle 1 to travel in order to increase the safety of the vehicle 1 along the roadway 37 based on the safety scores of the surrounding vehicles 39. That is, CPU 3 has determined the vehicle 1 may be safer along the roadway 37 in the adjacent lane of the roadway 37 behind the surrounding vehicle 39 with a higher safety than the surrounding vehicles 39 within the current lane of the vehicle 1.

In one or more embodiments, the CPU 3 may further employ information (i.e., the geometry of the roadway 37, the current position of the vehicle 1, the designated speed limit, etc.) received from the navigational sensor 7 of the vehicle 1 when generating an updated driving trajectory 43. The updated driving trajectory 43 may include one or more straight and/or curved maneuvers. Further, the driving trajectory 43 may be restricted to a maximum number of straight and/or curved maneuvers. In addition, in the case of a manned vehicle 1, the CPU 3 may present a plurality of updated driving trajectories 43 to a user of the vehicle 1 through the dashboard 9, permitting the user to select an updated driving trajectory 43 different from an optimum or safest updated driving trajectory 43. The plurality of updated driving trajectories 43 may differ in the number and type of maneuvers, as well as an estimated time associated with each maneuver.

In FIG. 5B, the vehicle 1 is depicted as being directly behind the surrounding vehicle 39 with no safety concerns 41 detected subsequent to traveling along the updated driving trajectory 43. In one or more embodiments, the CPU 3 is configured to control the steering, acceleration, braking, and/or any gear changes required by the vehicle 1 to carry out a driving process along the updated driving trajectory 43.

In one or more embodiments, the CPU 3 utilizes the latest data captured by the plurality of detection sensors 5 in order to continuously monitor and update the safety scores of the surrounding vehicles 39 within a predetermined distance from the vehicle 1. As such, the CPU 3 may also continuously update the driving trajectory 43 of the vehicle 1. For example, subsequent to changing lanes, the CPU 3 may have detected that the surrounding vehicle 39 previously determined to have no safety concerns 41 has a safety concern 41 that was not able to be detected from the previous location of the vehicle 1, such as damage to a side of the surrounding vehicle 39 previously out of sight from the visual sensors of the vehicle 1. Accordingly, the CPU 3 may generate and follow another updated driving trajectory 43.

In the example of FIG. 5B, subsequent to changing lanes of the roadway 37, the CPU 3 has employed another updated driving trajectory 43 in order to further increase the safety of the vehicle 1 along the roadway 37. In particular, the vehicle 1 is now traveling at a slower speed in order to increase the distance between the vehicle 1 and the surrounding vehicle 39 emitting alarming sounds from its exhaust, as this safety concern 41 may be associated with aggressive drivers.

In one or more embodiments, the autonomous or semi-autonomous driving process of the vehicle 1 may include an autonomous or semi-autonomous parking process. Therefore, an updated driving trajectory 43 generated by the CPU 3 may be in the form of an updated parking trajectory 45. Accordingly, FIGS. 6A-6C depict a visualization of a parking process in accordance with one or more embodiments disclosed herein. In one or more embodiments, the parking process of the vehicle 1 may be a parking-in process, such that the vehicle 1 is configured to enter an unoccupied parking space 47 and park. In one or more embodiments, the parking process of the vehicle 1 may be a parking-out process, such that the vehicle 1 is configured to exit a parking space 47 the vehicle 1 is currently located within.

In FIG. 6A, a vehicle 1 is traveling along a "parking lot" roadway 37 in search of an unoccupied parking space 47. In this non-limiting example, parking is available perpendicular to the roadway 37. In one or more embodiments, CPU 3 may identify unoccupied parking spaces 47 by processing data captured by the plurality of detection sensors 5 of the vehicle 1 as the vehicle 1 travels along the roadway 37. In FIG. 6A, the CPU 3 has identified an unoccupied parking space 47 along the roadway 37 between two parked surrounding vehicles 39. Accordingly, the CPU 3 determines a geometry of the unoccupied parking space 47 from the received data of the plurality of detection sensors 5 and compares the determined geometry of the unoccupied parking space 47 to a geometry of the vehicle 1. If the CPU 3 determines that the unoccupied parking space 47 is of a predetermined suitable size, the CPU 3 may commence a parking process.

Furthermore, the CPU 3 continuously monitors the data captured by the plurality of detection sensors 5 associated with surrounding vehicles 39 in order to update the driving trajectory 43 or parking trajectory 45 of the vehicle 1, such that the CPU 3 ensures the safety of the vehicle 1. In FIG. 6A, the CPU 3 has identified safety concerns 41 associated with the surrounding vehicles 39 in the parking spaces 47 directly next to the unoccupied parking space 47.

In one or more embodiments, the CPU 3 may abort a parking process of the vehicle 1 in the instance one or more surrounding vehicles 39 within a predetermined distance from an unoccupied parking space 47 are assigned a safety score below a predetermined threshold. Alternatively, in one or more embodiments, the CPU 3 may abort a parking process of the vehicle 1 in the instance one or more surrounding vehicles 39 with an assigned safety score below a predetermined threshold is determined to be within a predetermined distance from the vehicle 1 while the vehicle 1 is traveling along a parking trajectory 45. To this end, in the example of FIG. 6B, the CPU 3 has aborted a parking process into the unoccupied parking space 47 due to the safety scores of the surrounding vehicles 39 in the parking spaces 47 directly next to the unoccupied parking space 47 determined by the CPU 3. Accordingly, the CPU 3 updates the driving trajectory 43 of the vehicle 1 in order for the vehicle 1 to continue along the roadway 37 in search of a different unoccupied parking space 47.

In the non-limiting example of FIG. 6B, the safety scores of the surrounding vehicles 39 in the parking spaces 47 directly next to the unoccupied parking space 47 are based on damage-based safety concerns 41. However, in one or more embodiments, the CPU 3 may identify any form of safety concern 41 (i.e., visual-based safety concerns 41 and/or audio-based safety concerns 41) for a surrounding vehicle 39 within a parking space 47. For example, the CPU 3 may assign a relatively low safety score to a surrounding vehicle 39 within a parking space 47 that is emitting light in the form of hazard warning lights and/or emitting an alarming sound in the form of an alarm.

In the example of FIG. 6C, the CPU 3 has detected no safety concerns 41 associated with the surrounding vehicles 39 in the parking spaces 47 directly next to the unoccupied parking space 47. In turn, the CPU 3 determines an optimum parking trajectory 45 for the vehicle 1 to travel in order to park within the unoccupied parking space 47 based on the determined geometry of the unoccupied parking space 47 and a current location of the vehicle 1. In one or more embodiments, the CPU 3 may still employ a parking process of the vehicle 1 if the safety scores of the surrounding vehicles 39 in the parking spaces 47 directly next to the unoccupied parking space 47 are above a predetermined threshold.

The parking trajectory 45 of the vehicle 1 determined by the CPU 3 may include one or more straight and/or curved maneuvers. Further, the parking trajectory 45 may utilize forward maneuvers and rearward maneuvers to park the vehicle 1 in a forward-facing orientation or a rearward-facing orientation within the unoccupied parking space 47. In addition, the parking trajectory 45 may be restricted to a maximum number of straight and/or curved forward maneuvers and/or rearward maneuvers. As such, the CPU 3 may determine whether a parking process is at all possible for an associated unoccupied parking space 47. Furthermore, in the case of a manned vehicle 1, the CPU 3 may present a plurality of parking trajectories 45 to the user of the vehicle 1 through the dashboard 9. In this way, the user is permitted to select a parking trajectory 45 different from an optimum parking trajectory 45. The optimum parking trajectory 45 may be determined as the parking trajectory 45 that includes the least amount of maneuvers required to complete the associated parking process or has the lowest estimated time to complete the associated parking process. The final orientation of the vehicle 1 within the unoccupied parking space 47 may be predetermined by the user via the dashboard 9 or determined by the CPU 3 based on the optimum parking trajectory 45. Here, in the non-limiting FIG. 6C, the optimum parking trajectory 45 is depicted as maneuvering the vehicle 1 such that vehicle 1 backs into the unoccupied parking space 47.

The CPU 3 is configured to control the steering, acceleration, braking, and any gear changes required by the vehicle 1 to carry out a parking process along a parking trajectory 45. In one or more embodiments, the CPU 3 continuously monitors distances between the vehicle 1 and detected markings, objects, and/or obstacles delimiting the unoccupied parking space 47 and the adjoining roadway 37 measured by the plurality of detection sensors 5 during a parking process. In this way, the parking trajectory 45 of the vehicle 1 determined by the CPU 3 may be dynamically adjusted or corrected during the driving process as the geometries of the unoccupied parking space 47 and the adjoining roadway 37 are further measured. Further, in one or more embodiments, the parking process may be aborted by the CPU 3 if the CPU 3 determines safety concerns 41 associated with surrounding vehicles 39 within a predetermined distance from the vehicle 1 that were previously not visible or recorded by the plurality of detection sensors 5 from the previous locations or orientations of the vehicle 1.

Figure 7:
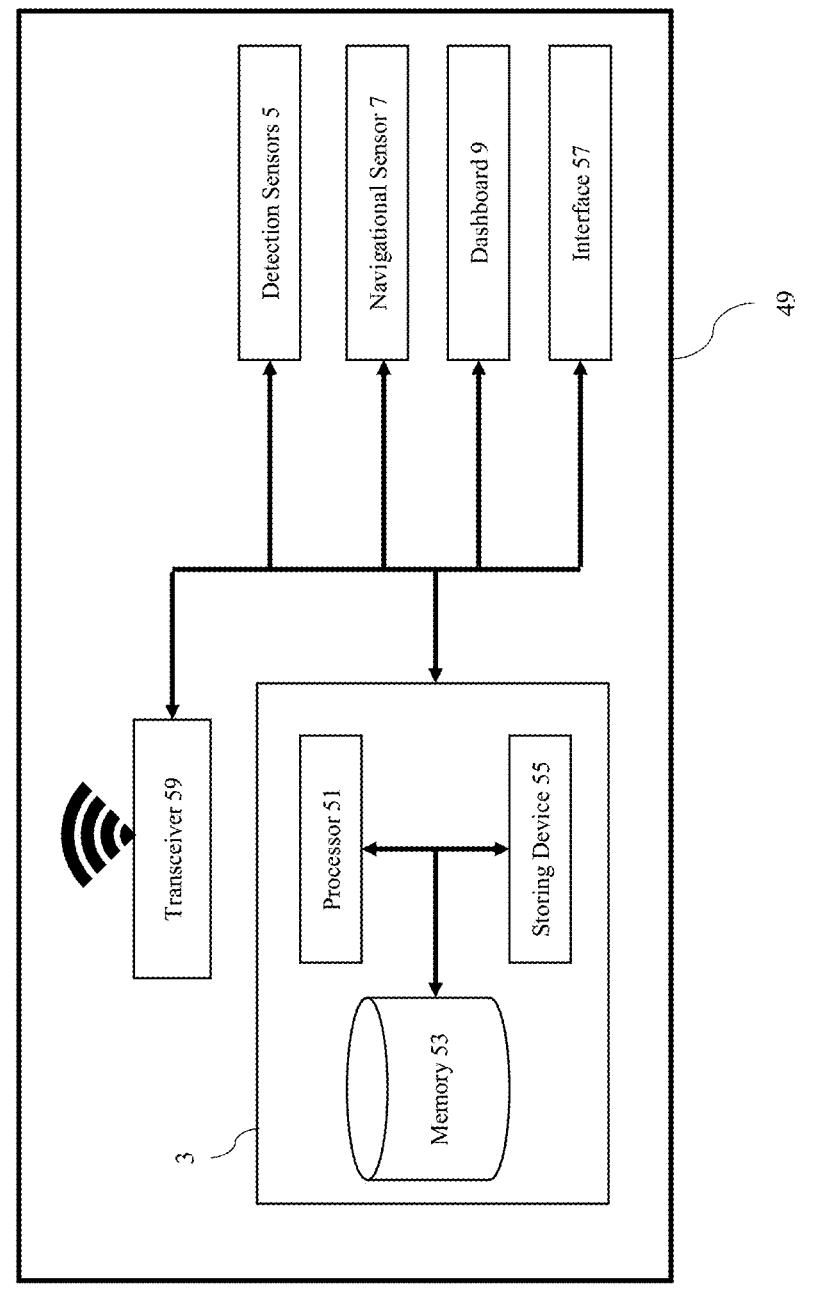
FIG. 7 shows a system in accordance with one or more embodiments disclosed herein.

FIG. 7 depicts a system overview of an Advanced Driver Assistance System (ADAS) 49 in accordance with one or more embodiments of the invention. The vehicle 1 includes a plurality of detection sensors 5 which may be a plurality of visual sensors (i.e., two dimensional camera, three dimensional or stereoscopic camera, radar unit, LiDAR unit, ultrasonic sensor, etc.) and/or a plurality of audio sensors (i.e., microphones or equivalent sensors). Additionally, the vehicle 1 includes a navigational sensor 7 which may be a GPS sensor. The navigational sensor 7 is configured to receive coordinates indicating the position of the vehicle 1 and, in one or more embodiments, the designated speed limit and/or geometry of a roadway 37 at the location of the coordinates, which may be utilized in the generation of a driving trajectory 43 of the vehicle 1. The location of the vehicle 1 may be determined by the navigational sensor 7 using satellite-based triangulation or trilateration, for example, and the navigational sensor 7 may be connected to a database, server, stored memory, or network to receive the designated speed limit and the geometry of the roadway 37, as is commonly known in the art. Alternatively, the designated speed limit and the geometry of the roadway 37 may be received from an external database or server, for example, or derived from information stored in the vehicle 1 itself.

The CPU 3 may be one or more mobile devices (e.g., laptop computer, smart phone, personal digital assistant, tablet computer, or other mobile device), desktop computers, servers, blades in a server chassis, one or more Electronic Control Units (ECUs) in a vehicle 1, or any other type of computing device or devices that includes at least the minimum processing power, memory, and input and output device(s) to perform one or more embodiments of the present disclosure. For example, as shown in FIG. 7, the CPU 3 may include one or more computer processors 51, associated memory 53, one or more storage device 55 (e.g., a hard disk, an optical drive such as a compact disk (CD) drive or digital versatile disk (DVD) drive, a flash memory stick, etc.), and numerous other elements and functionalities. The CPU 3 may be an integrated circuit for processing instructions. For example, the CPU 3 may be one or more cores, or micro-cores of a processor 51.

As described above, the plurality of detection sensors 5 transmits captured data of the external environment and surrounding vehicles 39 of the vehicle 1 to the CPU 3. In particular, the data is transmitted to the memory 53 of the CPU 3 wirelessly or by way of a bus 11, which is formed of wires, wiring harnesses, circuit boards, or equivalent means to interconnect the various components of the vehicle 1. The memory 53 is a non-transitory storage medium such as flash memory, cache memory, Random Access Memory (RAM), a Hard Disk Drive (HDD), a Solid State Drive (SSD), a combination thereof, or equivalent that holds data for the CPU 3 or other components (or a combination of both). In addition to storing the captured data, the memory 53 also stores trigonometric functions, dimensions of the vehicle 1, inputs, outputs, functions, and processes necessary to perform feature extraction, localization, path planning, autonomous maneuvering of the vehicle 1, user interaction(s) (e.g., via an interface 57 and/or dashboard 9), and other functions and processes described herein. Although illustrated as a single memory 53 in FIG. 7, two or more memories 53 may be employed according to particular needs, desires, or particular implementations of the CPU 3 and the described functionality. Further, while the memory 53 is illustrated as an integral component of the CPU 3, in alternative implementations, the memory 53 may be external to the CPU 3.

The ADAS 49 further includes an interface 57 and a dashboard 9 in order to transmit information to a user of the vehicle 1. The dashboard 9 may be a Liquid Crystal Display (LCD), Organic Light-Emitting Diode (OLED), or equivalent display, while the interface 57 may be one or more buttons, dials, or a touchscreen that allows a user to interact with the vehicle 1. The dashboard 9 displays information such as safety scores of surrounding vehicles 39, driving trajectories 43, and parking trajectories 45 to a user, which allows the user to see and/or select the maneuvers taken by the vehicle 1 in order to complete a driving process or a parking process. On the other hand, the interface 57 allows a user to select convenience features such as a unit for measuring the speed limit (such as Miles Per Hour (MPH) or Kilometers Per Hour (KPH)). The interface 57 may also be used to allow the user to manually identify and/or select an unoccupied parking space 47 for a parking process.

In one or more embodiments, the ADAS 49 includes a transceiver 59, which wirelessly transmits and receives signals to and from the vehicle 1. Example embodiments of the transceiver 59 include an antenna (not shown) and processor (not shown) that transmit and receive radar, radio, cellular, satellite, Wi-Fi, Bluetooth, Wi-Max, or other equivalent signals. The transceiver 59 may be used to connect the CPU 3 to a server in order to access a number of databases. Further, the transceiver 59 may be used to receive navigational information regarding a current or upcoming roadway 37. In addition, the transceiver 59 may transmit information about surrounding vehicles 39 (e.g., safety scores, safety concerns 41, etc.), the current roadway 37, unoccupied parking spaces 47, and occupied parking spaces 47 to a server or surrounding vehicles 39.

FIG. 8 depicts a flowchart 800 of a method for a driver assistance system of a vehicle 1 in accordance with one or more embodiments disclosed herein. Steps of the flowchart shown in FIG. 8 may be performed by an ADAS 49 as described herein but are not limited thereto. The constituent steps of the method depicted in FIG. 8 may be performed in any logical order, and the method is not limited to the sequence presented.

As depicted in FIG. 8, the method initiates at Step 810, which includes a CPU 3 initiating an autonomous or semi-autonomous driving process of a vehicle 1. In one or more embodiments, the autonomous or semi-autonomous driving process includes an autonomous or semi-autonomous park-ing process. Accordingly, during an autonomous or semi-autonomous driving process, the CPU 3 is employed to control the movements of the vehicle 1 for a user of the vehicle 1 automatically or upon request of the user. That is, the CPU 3 may control the steering, acceleration, braking, and/or any gear changes required by the vehicle 1 to travel to a desired destination of the user and/or park into or exit a parking space 47. During the autonomous or semi-autono-mous driving process of the vehicle 1, the CPU 3 utilizes received data associated with the external environment of the vehicle 1 from a plurality of detection sensors 5 of the vehicle 1 and navigational information from a navigational sensor 7 of the vehicle 1 in order to generate a driving trajectory 43 or a parking trajectory 45 for the vehicle 1.

As such, in Step 820, the plurality of detection sensors 5 of the vehicle 1 collect data associated with surrounding vehicles 39 within an external environment of the vehicle 1. Further, in one or more embodiments, the plurality of detection sensors 5 collect data associated with the external environment itself. The data of the external environment of the vehicle 1 may be captured while the vehicle 1 is stationary or mobile.

In one or more embodiments, the plurality of detection sensors 5 includes at least one visual sensor (i.e., two dimensional camera, three dimensional or stereoscopic cam-era, radar unit, LiDAR unit, ultrasonic sensor, etc.) and/or at least one audio sensor (i.e., a microphone or an equivalent sensor). Further, the plurality of detection sensors 5 may include a plurality of visual sensors and a plurality of audio sensors that include all the same type of visual sensors and audio sensors, respectively, or the plurality of visual sensors and the plurality of audio sensors may include a combination of visual sensors and audio sensors, respectively, that vary in type.

The plurality of detection sensors 5 of the vehicle 1 may be positioned along the front end, rear end, and/or sides of the vehicle 1. As such, data collected by the plurality of detection sensors 5 may include several different views or recordings of the external environment of the vehicle 1.

In one or more embodiments, the navigational sensor 7 receives navigational information from a signal that includes global coordinates of the vehicle 1. In particular, an ADAS 49 of a vehicle 1 includes a navigational sensor 7, which connects to a satellite network to receive the coordinates. In addition to the location of the vehicle 1, the navigational sensor 7 may receive information of an accurate estimate of the current speed and/or orientation of the vehicle 1 and the geometry and designated speed limit of the current roadway 37 of the vehicle 1. The position and speed of the vehicle 1 may be derived through a triangulation or trilateration procedure, while the designated speed limit and geometry of the roadway 37 may be received from an external source (such as a server) or a stored database, such as a data annotated map.

In Step 830, the CPU 3 receives the data from the plurality of detection sensors 5, as well as the navigational informa-tion from the navigational sensor 7. As discussed above, the CPU 3 may be connected to the plurality of detection sensors 5 and the navigational sensor 7 wirelessly or via a bus 11. Thus, Step 830 includes transmitting the data from the plurality of detection sensors 5 and the navigational infor-mation from navigational sensor 7 to the CPU 3.

In one or more embodiments, in addition to the data associated with surrounding vehicles 39 within the external environment of the vehicle 1, CPU 3 may receive data associated with other objects (e.g., roadways 37, lane marks, curbs, traffic signs, pedestrians, etc.) within the external environment.

Subsequently, in Step 840, the data received from the plurality of detection sensors 5 is processed and analyzed by the CPU 3 in order to detect, identify, and/or classify any safety concerns 41 associated with surrounding vehicles 39 within the external environment of the vehicle 1. Specifi-cally, the CPU 3 applies one or more of machine learned models to visual data (i.e., video feeds, series of image frames, etc.) acquired using visual sensors disposed on a vehicle 1 to detect, identify, and/or classify visual-based safety concerns 41 associated with surrounding vehicles 39 detected in the external environment of the vehicle 1.

In one or more embodiments, the CPU 3 employs a VSM 13. In one or more embodiments, a pre-processing that is specific to one or more visual sensors may be performed prior to the employment of the VSM 13. Subsequently, the CPU 3 utilizes the VSM 13 to detect surrounding vehicles 39 within the external environment of the vehicle 1 from the visual data. The VSM 13 may utilize image by image processing techniques known to those of ordinary skill in the art. Further, the image processing of the VSM 13 may also include a depth estimation, semantic segmentation, visual odometry, and/or motion segmentation.

Subsequently, the visual data is further processed by the VSM 13 to identify safety concerns 41 of each detected surrounding vehicle 39 within a predetermined distance from the vehicle 1. In or more embodiments, the VSM 13 detects safety concerns 41 based on damaged detected upon the surrounding vehicles 39, the presence or absence of light emitted by the surrounding vehicles 39, the model/age of the surrounding vehicles 39, and/or the movements (i.e., posi-tion, speed, direction, etc.) of the surrounding vehicles 39. Each identified, visual-based safety concern 41 associated with a surrounding vehicle 39 is then classified (e.g., by type, size, location, frequency of occurrence, etc.) by the VSM 13.

In one or more embodiments, one or more machine learned models are applied to audio data acquired by audio sensors of the plurality of detection sensors 5 disposed along the vehicle 1 to detect, identify, and/or classify audio-based safety concerns 41 associated with surrounding vehicles 39 detected in the external environment of the vehicle 1. Accordingly, in one or more embodiments, the CPU 3 employs a SSM 17 to detect, identify, and/or classify any audio-based safety concerns 41 associated with surrounding vehicles 39.

In one or more embodiments, prior to the employment of the SSM 17 and/or prior to the CPU 3 receiving the audio data, the audio may be preprocessed (e.g., by a low-pass filter, a high-pass filter, an amplifier, an analog-to-digital converter, etc.). The preprocessing of the audio data may be performed by a sound processor or the CPU 3 itself. Sub-sequent to preprocessing, the audio data of each audio sensor of the plurality of sensors is separated into one or more audio segments by the sound processor, the CPU 3, or a device with similar capabilities. Next, the audio segments are transformed (e.g., via a Fast Fourier Transformation, Con-stant-Q Transformation, Mel Frequency Cepstral Coeffi-cients, etc.) from a time domain to a frequency domain in order to generate spectrograms. In one or more embodi-ments, the audio segments may be clipped into subsets based on a predetermined frequency threshold such that only audio data containing a frequency above the threshold is analyzed. The spectrograms are then analyzed by the SSM 17 to detect sounds associated with surrounding vehicles 39 present in the audio segments. More specifically, the SSM 17 is configured to detect alarming sounds associated with audio-based safety concerns 41 present in the audio segments (e.g., engine and exhaust noises, tires screeching, worn brakes, honks, alarms, and sirens, etc.). Thereafter, the SSM 17 classifies (e.g., by type, frequency of occurrence, volume level, etc.) each audio-based safety concern 41 identified.

Subsequent to the detection of sounds including audio-based safety concerns 41, a localization process is performed by the SSM 17 in order to identify the one or more surrounding vehicles 39 that are the source of the audio-based safety concerns 41. In one or more embodiments, the localization process may be performed by utilizing localization techniques such as acoustic triangulation, trilateration, multilateration, angle of arrival estimation, and/or other techniques known to a person of ordinary skill in the art.

In one or more embodiments, the SSM 17 employs the visual data collected by the visual sensors of the plurality of detection sensors 5 in order to assist or corroborate in the identification of the audio source. Specifically, the SSM 17 analyzes the data obtained by the visual sensors to detect surrounding vehicles 39 within the estimated position of an audio source determined by the localization process. The SSM 17 may utilize image by image processing techniques known to those of ordinary skill in the art in order to perform object detection, depth estimation, semantic segmentation, visual odometry, and/or motion segmentation.

In one or more embodiments, a single model may be applied to detect safety concerns 41 of surrounding vehicles 39 from both the visual data and the audio data. In one or more embodiments, one or more machine learned models are applied to the visual data in order to determine the position, orientation, movement, etc. of additional detected objects (i.e., roadways 37, lane marks, curbs, pedestrians, traffic signs, etc.).

In Step 850, subsequent to the identification and/or classification of safety concerns 41 associated with surrounding vehicles 39, the one or more machine learned models further determine a safety score for each surrounding vehicle 39 within a predetermined distance from the vehicle 1. In one or more embodiments, the CPU 3 may actuate external and/or internal warnings of the vehicle 1 based on certain identified and/or classified safety concerns 41.

In one or more embodiments, each safety concern 41 of a surrounding vehicle 39 is assigned a predetermined value. In one or more embodiments, the predetermined value of a safety concern 41 may vary based on the type (i.e., damage-based, movement-based, light emission-based, audio-based, etc.) of safety concern 41. Further, in one or more embodiments, weights may be assigned to each safety concern 41 based on the classification of the safety concern 41 made in Step 840. In this way, the predetermined value of each safety concern 41 is multiplied by the weight(s) assigned to the respective safety concern 41.

The one or more machine learned models may determine each surrounding vehicle 39 to present zero or more safety concerns 41. Accordingly, the safety score of a surrounding vehicle 39 may be calculated by Equation (1) above.

In one or more embodiments, the safety score of a surrounding vehicle 39 may be weighted based on the amount of safety concerns 41 detected. That is, a multiplier may be applied to the safety score itself if the associated surrounding vehicle 39 has more than a predetermined number of safety concerns 41. Further, in one or more embodiments, the safety score of a surrounding vehicle 39 may increase or decrease as time passes. Specifically, a weight applied to a safety concern 41 based on the frequency of occurrence of the safety concern 41 over a period of time may increase or decrease as time passes.

In Step 860, subsequent to the determination of safety scores for each surrounding vehicle 39 within a predetermined distance from the vehicle 1, one or more machine learned models of the CPU 3 may update the driving trajectory 43 or parking trajectory 45 of the vehicle 1. In one or more embodiments, the DTM 15 determines whether the current driving trajectory 43 or the current parking trajectory 45 of the vehicle 1 should be maintained or altered based on the safety scores of the surrounding vehicles 39. In one or more embodiments, the DTM 15 receives safety scores associated with surrounding vehicles 39 from one or more other machine learned models (e.g., the VSM 13 and/or the SSM 17). In one or more embodiments, a single model may be applied to detect safety concerns 41 of surrounding vehicles 39, assign the surrounding vehicles 39 safety scores, and update a driving process of a vehicle 1 based on the safety scores of the surrounding vehicles 39.

In one or more embodiments, the DTM 15 may alter the driving trajectory 43 or the parking trajectory 45 of the vehicle 1 based on a plurality of predetermined ranges that the value of the safety score of a surrounding vehicle 39 falls within. That is, the type, direction, and/or number of maneuvers of an updated driving trajectory 43 or updated parking trajectory 45 may be based on the value of the safety score(s) of one or more surrounding vehicles 39.

In one or more embodiments, in addition to the safety scores of surrounding vehicles 39, the data captured by the plurality of detection sensors 5 may also be input into the DTM 15. Accordingly, the DTM 15 may process the data with methods similar to the VSM 13 or SSM 17. In one or more embodiments, the DTM 15 receives the data preprocessed from the VSM 13 or SSM 17. Furthermore, the DTM 15 may receive the navigational information as an input. In this way, the DTM 15 may utilize the position, geometry, orientation, movement, etc. of detected objects (i.e., roadways 37, parking spaces 47, lane marks, curbs, surrounding vehicles 39, pedestrians, and traffic signs, etc.) in the determination of an updated driving trajectory 43 or an update parking trajectory 45 of the vehicle 1.

Subsequent to the driving trajectory 43 or parking trajectory 45 of the vehicle 1 being updated, the method may restart at Step 810. That is, the driving process of the vehicle 1 may be updated by the CPU 3 to follow the updated driving trajectory 43 or the updated parking trajectory 45. In one or more embodiments, the CPU 3 may generate a plurality of driving trajectory 43 options or a plurality of parking trajectory 45 options. In this way, in the case of a manned vehicle 1, a user of the vehicle 1 may select a desired driving trajectory 43 of the plurality of driving trajectory 43 options or a desired parking trajectory 45 of the plurality of parking trajectory 45 options.

In one or more embodiments, the CPU 3 employs the latest data received from the plurality of detection sensors 5 in order to continuously monitor safety scores of the surrounding vehicles 39 and the distances between the vehicle 1 and detected markings, objects, and/or obstacles delimiting the roadway 37 and/or parking space 47. In this way, the driving trajectory 43 or the parking trajectory 45 of the vehicle 1 determined by the CPU 3 may be dynamically adjusted or corrected during the driving process as the geometries of the roadway 37 and/or unoccupied parking space 47 are further measured. Further, in one or more embodiments, a parking process of the vehicle 1 may be aborted by the CPU 3 if the CPU 3 determines safety concerns 41 associated with surrounding vehicles 39 that were previously not visible or recorded by the plurality of detection sensors 5 from the previous locations or orientations of the vehicle 1.

Accordingly, embodiments disclosed herein relate to systems and methods useful for increasing the safety of a vehicle 1 by updating a driving trajectory 43 or parking trajectory 45 of an autonomous or semi-autonomous driving process of the vehicle 1 based on collected data associated with surrounding vehicles 39 within the external environment of the vehicle 1. Specifically, embodiments disclosed herein may utilize one or more machine learned models to detect safety concerns 41 of surrounding vehicles 39, assign safety scores to the surrounding vehicles 39, and update a driving trajectory 43 or a parking trajectory 45 of the vehicle 1 based on the safety scores of the surrounding vehicles 39. Accordingly, the disclosed systems and methods advantageously recognize surrounding vehicles 39 that include characteristics that are deemed unsafe. In this way, the disclosed systems and methods advantageously update a driving trajectory 43 or parking trajectory 45 of an autonomous or semi-autonomous driving process of the vehicle 1 in order to position the vehicle 1 in a safe location along the roadway 37.

While multiple embodiments and machine learned model types have been suggested, one skilled in the art will appreciate that this process, of detecting safety concerns 41 of surrounding vehicles 39, assigning safety scores to the surrounding vehicles 39, and updating a driving trajectory 43 or a parking trajectory 45 of the vehicle 1 based on the safety scores of the surrounding vehicles 39, is not limited to the use of the machine learned models described herein. Machine learned models such a random forest, or non-parametric methods such a K-nearest neighbors or a Gaussian process may be readily inserted into this framework and do not depart from the scope of this disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method for operating a driver assistance system of a vehicle, comprising:

initiating an autonomous or semi-autonomous driving process of the vehicle;

collecting data associated with surrounding vehicles within an external environment of the vehicle;

transmitting the data associated with the surrounding vehicles to a Central Processing Unit (CPU) comprising one or more processors;

determining, with one or more machine learned models, safety concerns of the surrounding vehicles based on the data associated with the surrounding vehicles;

determining, with the one or more machine learned models, a safety score of each surrounding vehicle of the surrounding vehicles located within a predetermined distance from the vehicle based on the respective safety concerns of each surrounding vehicle; and updating, with the one or more machine learned models, a driving trajectory and a parking trajectory of the autonomous or semi-autonomous driving process of the vehicle based on the safety scores of the surrounding vehicles.

2. The method of claim 1, wherein the collecting data associated with the surrounding vehicles comprises at least one of the following:

capturing a video feed of the external environment of the vehicle; and capturing an audio feed of the external environment of the vehicle.

3. The method of claim 1, further comprising determining a speed and a position of each surrounding vehicle within the predetermined distance from the vehicle from the data associated with the surrounding vehicles.

4. The method of claim 1, further comprising notifying a user of the vehicle of one or more vehicle operating conditions.

5. The method of claim 1, further comprising notifying a user of the safety scores of the surrounding vehicles.

6. A non-transitory computer readable medium storing instructions executable by one or more processors of a Central Processing Unit (CPU), the instructions comprising functionality for:

initiating an autonomous or semi-autonomous driving process of a vehicle;

receiving data associated with surrounding vehicles within an external environment of the vehicle from a plurality of detection sensors of the vehicle;

determining, with one or more machine learned models, safety concerns of the surrounding vehicles based on the data associated with the surrounding vehicles;

determining, with the one or more machine learned models, a safety score of each surrounding vehicle of the surrounding vehicles located within a predetermined distance from the vehicle based on the respective safety concerns of each surrounding vehicle; and updating, with the one or more machine learned models, a driving trajectory and a parking trajectory of the autonomous or semi-autonomous driving process of the vehicle based on the safety scores of the surrounding vehicles.

7. The non-transitory computer readable medium of claim 6, further comprising instructions for at least one of the following:

determining, with the one or more machine learned models, the safety scores of the surrounding vehicles based on damage detected upon the surrounding vehicles;

determining, with the one or more machine learned models, the safety scores of the surrounding vehicles based on detected alarming sounds emitted from the surrounding vehicles; and determining, with the one or more machine learned models, the safety scores of the surrounding vehicles based on detected hazardous movements of the surrounding vehicles.

8. The non-transitory computer readable medium of claim 7, further comprising instructions for at least one of the following:

classifying the detected damage of the surrounding vehicles;

classifying the detected alarming sounds of the surrounding vehicles; and classifying the detected hazardous movements of the surrounding vehicles.

9. A driver assistance system of a vehicle, comprising:

a plurality of detection sensors configured to collect data associated with surrounding vehicles within an external environment of the vehicle;

one or more machine learned models; and a Central Processing Unit (CPU), comprising:

one or more processors; and a non-transitory computer readable medium storing instructions executable by the one or more processors, the instructions comprising functionality for:

initiating an autonomous or semi-autonomous driving process of the vehicle;

receiving the data associated with the surrounding vehicles from the plurality of detection sensors;

determining, with the one or more machine learned models, safety concerns of the surrounding vehicles based on the data associated with the surrounding vehicles;

determining, with the one or more machine learned models, a safety score of each surrounding vehicle of the surrounding vehicles located within a predetermined distance from the vehicle based on the respective safety concerns of each surrounding vehicle; and updating, with the one or more machine learned models, a driving trajectory and a parking trajectory of the autonomous or semi-autonomous driving process of the vehicle based on the safety scores of the surrounding vehicles.

10. The driver assistance system of claim 9, wherein at least one detection sensor of the plurality of detection sensors is a visual sensor configured to capture a video feed of the external environment of the vehicle.

11. The driver assistance system of claim 9, wherein at least one detection sensor of the plurality of detection sensors is an audio sensor configured to capture an audio feed of the external environment of the vehicle.

12. The driver assistance system of claim 9, wherein at least one detection sensor of the plurality of detection sensors is an ultrasonic sensor.

13. The driver assistance system of claim 9, wherein the CPU further comprises instructions for determining a speed and a position of each surrounding vehicle within the predetermined distance from the vehicle from the data collected by the plurality of detection sensors.

14. The driver assistance system of claim 9, wherein the safety concerns comprise at least one of the following:

damage detected upon the surrounding vehicles;

alarming sounds emitted from the surrounding vehicles; and hazardous movements of the surrounding vehicles.

15. The driver assistance system of claim 14, wherein the CPU further comprises instructions for at least one of the following:

determining, with the one or more machine learned models, the safety scores of the surrounding vehicles based on the damage detected upon the surrounding vehicles;

determining, with the one or more machine learned models, the safety scores of the surrounding vehicles based on the alarming sounds emitted from the surrounding vehicles; and determining, with the one or more machine learned models, the safety scores of the surrounding vehicles based on the hazardous movements of the surrounding vehicles.

16. The driver assistance system of claim 14, wherein the CPU further comprises instructions for at least one of the following:

classifying the detected damage of the surrounding vehicles;

classifying the detected sounds of the surrounding vehicles; and classifying the detected movements of the surrounding vehicles.

17. The driver assistance system of claim 9, further comprising a dashboard configured to notify a user of the vehicle of one or more vehicle operating conditions.

18. The driver assistance system of claim 17, wherein the CPU further comprises instructions for outputting an alert to the dashboard, thereby notifying the user of the vehicle the safety scores of the surrounding vehicles.

* * * * *